(12) United States Patent
Poddar et al.

(10) Patent No.: US 10,635,909 B2
(45) Date of Patent: Apr. 28, 2020

(54) VEHICLE CONTROL WITH EFFICIENT ITERATIVE TRIANGULATION

(71) Applicant: TEXAS INSTRUMENTS INCORPORATED, Dallas, TX (US)

(72) Inventors: Deepak Kumar Poddar, Bangalore (IN); Shyam Jagannathan, Bangalore (IN); Soyeb Nagori, Bangalore (IN); Pramod Kumar Swami, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 252 days.

(21) Appl. No.: 15/346,491

(22) Filed: Nov. 8, 2016

(65) Prior Publication Data

US 2017/0193311 A1 Jul. 6, 2017

(30) Foreign Application Priority Data

Dec. 30, 2015 (IN) .......................... 7078/CHE/2015

(51) Int. Cl.
| | |
|---|---|
| *G05D 3/00* | (2006.01) |
| *G06K 9/00* | (2006.01) |
| *G06F 9/30* | (2018.01) |
| *G06F 15/80* | (2006.01) |
| *G05D 1/02* | (2006.01) |
| *G06K 9/52* | (2006.01) |

(52) U.S. Cl.
CPC ....... *G06K 9/00791* (2013.01); *G05D 1/0253* (2013.01); *G06F 9/30007* (2013.01); *G06F 15/8007* (2013.01); *G06K 9/52* (2013.01)

(58) Field of Classification Search
CPC ...... G06K 9/00791; G06K 9/52; G06T 15/20; G06T 2207/30252; G05D 1/0253; G06F 15/8007; G06F 9/30007; B60R 11/04
See application file for complete search history.

(56) References Cited

U.S. PATENT DOCUMENTS

| | | | | | |
|---|---|---|---|---|---|
| 4,744,086 | A | * | 5/1988 | Komly .................. | H03M 13/13 714/762 |
| 5,579,401 | A | * | 11/1996 | Gear ......................... | G06T 7/20 348/416.1 |

(Continued)

OTHER PUBLICATIONS

Jaime Moreno, Matrix Computations on Systolic-Type Arrays, Kluwer Academic Publishers—1992.*

(Continued)

*Primary Examiner* — Philip P. Dang
(74) *Attorney, Agent, or Firm* — Ebby Abraham; Charles A. Brill; Frank D. Cimino

(57) ABSTRACT

A vehicular structure from motion (SfM) system can include an input to receive a sequence of image frames acquired from a camera on a vehicle and an SIMD processor to process 2D feature point input data extracted from the image frames so as to compute 3D points. For a given 3D point, the SfM system can calculate partial $A^TA$ and partial $A^Tb$ matrices outside of an iterative triangulation loop, reducing computational complexity inside the loop. Multiple tracks can be processed together to take full advantage of SIMD instruction parallelism.

19 Claims, 13 Drawing Sheets

(56) References Cited

U.S. PATENT DOCUMENTS

| | | | | |
|---|---|---|---|---|
| 5,777,608 A * | 7/1998 | Lipovski | G06F 7/02 345/519 |
| 6,025,790 A * | 2/2000 | Saneyoshi | G05D 1/0251 340/946 |
| 6,163,575 A * | 12/2000 | Nieweglowski | H04N 19/517 375/240.16 |
| 6,215,915 B1 * | 4/2001 | Reyzin | G06T 3/00 345/648 |
| 6,381,375 B1 * | 4/2002 | Reyzin | G06T 3/00 345/648 |
| 6,546,120 B1 * | 4/2003 | Etoh | G06T 7/20 348/154 |
| 6,640,018 B1 * | 10/2003 | Thesen | G06T 3/60 345/649 |
| 6,675,187 B1 * | 1/2004 | Greenberger | G06F 1/02 708/622 |
| 6,677,957 B2 * | 1/2004 | Grzeszczuk | G06T 15/00 345/420 |
| 6,853,373 B2 * | 2/2005 | Williams | G06T 17/20 345/419 |
| 6,873,724 B2 * | 3/2005 | Brand | G06T 17/10 345/419 |
| 6,963,303 B1 * | 11/2005 | Beisner | G01S 7/292 342/159 |
| 7,002,510 B1 * | 2/2006 | Choate | G01S 11/04 342/118 |
| 7,053,894 B2 * | 5/2006 | Grzeszczuk | G06T 15/00 345/428 |
| 7,062,419 B2 * | 6/2006 | Grzeszczuk | G06F 17/16 382/154 |
| 7,205,999 B2 * | 4/2007 | Leather | G09G 5/026 345/582 |
| 7,219,289 B2 * | 5/2007 | Dickson | G06F 11/1076 714/752 |
| 7,418,470 B2 * | 8/2008 | Howard | G06F 8/45 706/10 |
| 7,519,522 B2 * | 4/2009 | Smith | G06F 17/5095 703/1 |
| 7,571,084 B2 * | 8/2009 | Smith | G06F 17/5095 703/8 |
| 7,590,589 B2 * | 9/2009 | Hoffberg | G06Q 20/401 705/37 |
| 7,669,051 B2 * | 2/2010 | Redlich | C07K 14/70575 713/166 |
| 7,848,580 B2 * | 12/2010 | Horie | H04N 19/176 382/232 |
| 7,908,539 B2 * | 3/2011 | Senda | H03M 13/118 714/752 |
| 7,953,249 B2 * | 5/2011 | Mertens | G01J 3/46 382/112 |
| 7,962,828 B2 * | 6/2011 | Kyung | H03M 13/1162 714/758 |
| 8,102,427 B2 * | 1/2012 | Jung | G06T 7/246 348/118 |
| 8,130,120 B2 * | 3/2012 | Kawabata | B60R 1/00 340/454 |
| 8,165,214 B2 * | 4/2012 | Iliev | G06F 17/16 375/240.01 |
| 8,229,166 B2 * | 7/2012 | Teng | G06T 7/20 382/103 |
| 8,237,638 B2 * | 8/2012 | Smith | G09G 3/2014 345/82 |
| 8,244,474 B2 * | 8/2012 | Matsuyama | G16B 30/00 702/19 |
| 8,265,212 B2 * | 9/2012 | Hum | H04B 7/0456 375/347 |
| 8,300,950 B2 * | 10/2012 | Ito | G06K 9/00248 382/201 |
| 8,301,451 B2 * | 10/2012 | Wouters | G10L 13/07 704/258 |
| 8,341,205 B2 * | 12/2012 | Tzeng | G06F 17/16 708/200 |
| 8,396,693 B2 * | 3/2013 | Danko | G06F 17/13 703/10 |
| 8,401,235 B2 * | 3/2013 | Lee | G01S 15/025 340/435 |
| 8,411,732 B2 * | 4/2013 | Sampath | H04B 7/0413 370/208 |
| 8,468,244 B2 * | 6/2013 | Redlich | G06Q 10/06 709/225 |
| 8,525,727 B2 * | 9/2013 | Roh | G01S 19/40 342/357.35 |
| 8,539,201 B2 * | 9/2013 | McAllister | G06F 17/142 712/22 |
| 8,600,830 B2 * | 12/2013 | Hoffberg | G06Q 30/0207 705/26.3 |
| 8,630,806 B1 * | 1/2014 | Zhu | B60W 30/16 701/408 |
| 8,639,267 B2 * | 1/2014 | Johnson | H04W 4/02 455/456.3 |
| 8,645,698 B2 * | 2/2014 | Yi | H04L 9/085 380/277 |
| 8,656,247 B2 * | 2/2014 | Kyung | H03M 13/1111 714/758 |
| 8,676,736 B2 * | 3/2014 | Pilaszy | G06Q 10/00 706/46 |
| 8,685,641 B2 * | 4/2014 | Nakamura | C12Q 1/6886 435/4 |
| 8,718,598 B2 * | 5/2014 | Johnson | H04W 4/02 370/331 |
| 8,726,281 B2 * | 5/2014 | Raghavan | G06F 8/4432 718/101 |
| 8,755,837 B2 * | 6/2014 | Rhoads | G06K 9/6253 455/556.1 |
| 8,894,228 B2 * | 11/2014 | Arbesman | B21D 37/08 359/853 |
| 8,897,741 B2 * | 11/2014 | Johnson | H04W 4/02 455/404.2 |
| 8,909,156 B2 * | 12/2014 | Tee | H04B 7/0695 455/63.1 |
| 9,007,432 B2 * | 4/2015 | Chuang | G08B 13/19619 348/39 |
| 9,053,388 B2 * | 6/2015 | Ito | G06K 9/00248 |
| 9,070,285 B1 * | 6/2015 | Ramu | G05D 1/0044 |
| 9,107,595 B1 * | 8/2015 | Smyth | A61B 5/04012 |
| 9,165,372 B2 * | 10/2015 | Williams | G06T 7/20 |
| 9,225,969 B2 * | 12/2015 | Aguirre-Valencia | G06T 3/40 |
| 2007/0233386 A1 * | 10/2007 | Saito | B62D 15/025 701/300 |
| 2008/0232198 A1 * | 9/2008 | Hayasaka | G01S 7/52004 367/99 |
| 2008/0253606 A1 * | 10/2008 | Fujimaki | G08G 1/161 382/100 |
| 2009/0121899 A1 * | 5/2009 | Kakinami | B62D 15/027 340/932.2 |
| 2009/0208109 A1 * | 8/2009 | Kakinami | B60Q 9/004 382/190 |
| 2009/0279741 A1 * | 11/2009 | Susca | G06T 7/246 382/107 |
| 2010/0045448 A1 * | 2/2010 | Kakinami | B60R 1/00 340/435 |
| 2010/0183192 A1 * | 7/2010 | Fritsch | G06T 7/254 382/103 |
| 2011/0262009 A1 * | 10/2011 | Duan | G06K 9/00805 382/103 |
| 2013/0070962 A1 * | 3/2013 | Yankun | G06T 7/20 382/103 |
| 2013/0250109 A1 * | 9/2013 | Yokota | H04N 5/2254 348/148 |

OTHER PUBLICATIONS

H. T. Kung, "Matrix triangularization by systolic arrays", Computer Science Department. Paper 1603. 1982.*

Jaime Moreno, Matrix Computations on Systolic-Type Arrays, Kluwer Academic Publishers—1992 (Year: 1982).*

(56) References Cited

OTHER PUBLICATIONS

H. T. Kung, "Matrix triangularization by systolic arrays", Computer Science Department. Paper 1603. 1982 (Year: 1982).*
Howard Anton, Elementary Linear Algebra Application Version, 1991 (Year: 1991).*
Richard Broson, Matrix Methods—An Introduction—1970 (Year: 1970).*
Hartley, et al.: "*Triangulation*"; Computer Vision and Image Understanding, vol. 68, No. 2, Nov. 1997, p. 146-157; Article No. IV970547.

\* cited by examiner

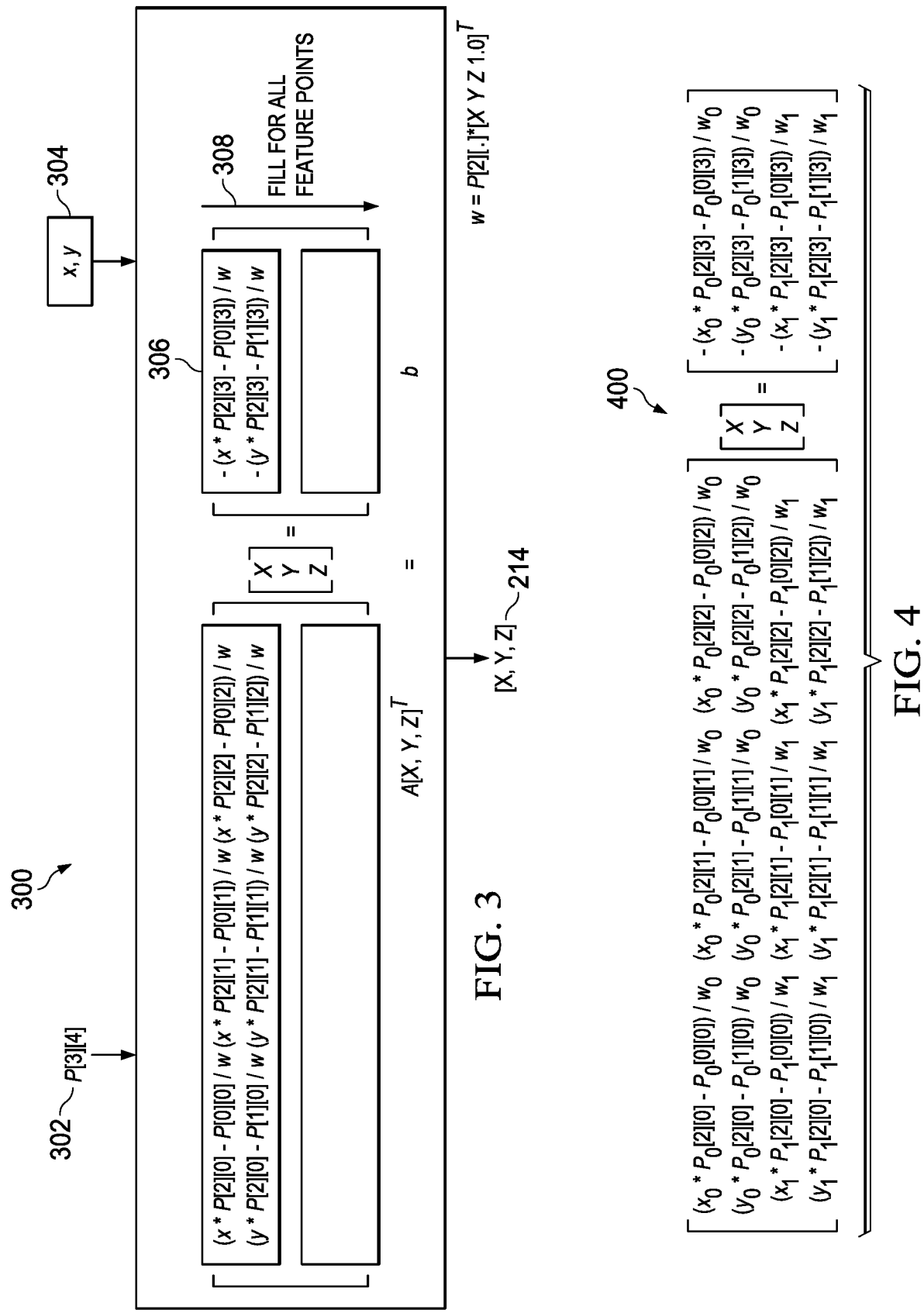

$$500 \rightarrow \begin{bmatrix} a_{00} & a_{01} & a_{02} \\ a_{10} & a_{11} & a_{12} \\ a_{20} & a_{21} & a_{22} \\ a_{30} & a_{31} & a_{32} \end{bmatrix}$$

FIG. 5

$$600 \rightarrow \begin{bmatrix} a_{00}a_{00} + a_{10}a_{10} + a_{20}a_{20} + a_{30}a_{30} & a_{00}a_{01} + a_{10}a_{11} + a_{20}a_{21} + a_{30}a_{31} & a_{00}a_{02} + a_{10}a_{12} + a_{20}a_{22} + a_{30}a_{32} \\ & a_{01}a_{01} + a_{11}a_{11} + a_{21}a_{21} + a_{31}a_{31} & a_{01}a_{02} + a_{11}a_{12} + a_{21}a_{22} + a_{31}a_{32} \\ & & a_{02}a_{02} + a_{12}a_{12} + a_{22}a_{22} + a_{32}a_{32} \end{bmatrix}$$

FIG. 6

$$900 \rightarrow \begin{bmatrix} a_{00}a_{00} + a_{10}a_{10} & a_{20}a_{20} + a_{30}a_{30} \\ a_{00}a_{01} + a_{10}a_{11} & a_{20}a_{21} + a_{30}a_{31} \\ a_{00}a_{03} + a_{10}a_{13} & a_{20}a_{23} + a_{30}a_{33} \\ a_{01}a_{01} + a_{11}a_{11} & a_{21}a_{21} + a_{31}a_{31} \\ a_{01}a_{02} + a_{11}a_{12} & a_{21}a_{22} + a_{31}a_{32} \\ a_{02}a_{02} + a_{12}a_{12} & a_{22}a_{22} + a_{32}a_{32} \end{bmatrix} \Bigg\} \text{SIX ROWS FOR SIX UNIQUE ELEMENTS OF } A^T A$$

$$\underbrace{\phantom{XXXXXXXXXXXXXXXXXX}}_{\text{TWO COLUMNS FOR A TWO-FRAME STACK}}$$

FIG. 9

$$1000 \rightarrow \begin{bmatrix} a_{00}a_{00} + a_{10}a_{10} & a_{20}a_{20} + a_{30}a_{30} & a_{00}a_{01} + a_{10}a_{11} & a_{20}a_{21} + a_{30}a_{31} & a_{00}a_{03} + a_{10}a_{13} & a_{20}a_{23} + a_{30}a_{33} \\ & & a_{01}a_{01} + a_{11}a_{11} & a_{21}a_{21} + a_{31}a_{31} & a_{01}a_{02} + a_{11}a_{12} & a_{21}a_{22} + a_{31}a_{32} \\ & & & & a_{02}a_{02} + a_{12}a_{12} & a_{22}a_{22} + a_{32}a_{32} \end{bmatrix}$$

FIG. 10

VEHICLE CONTROL WITH EFFICIENT ITERATIVE TRIANGULATION

CROSS-REFERENCE TO RELATED APPLICATION

This application claims priority to Indian provisional patent application No. 7078/CHE/2015, filed in the Indian Patent Office on 30 Dec. 2015.

TECHNICAL FIELD

This disclosure relates to computer vision systems and methods. More particularly, this disclosure relates to systems and methods for providing structure-perceptive vision to vehicles for autonomous or driver-assisted navigation or safety-feature activation. This disclosure particularly relates to vehicle control with efficient iterative triangulation.

BACKGROUND

Structure from motion (SfM) is a range imaging technique for estimating three-dimensional (3D) structures from two-dimensional (2D) image sequences from a single camera. Because it can recover 3D information from a single, inexpensive camera, it can be a cost-effective solution as compared to stereo imaging systems or range sensors like lidar or automotive radar. SfM can also increase the robustness of advanced driver assistance systems (ADAS) while working in tandem with other sensors, such as radar, to provide automatic emergency braking (AEB).

Triangulation methods may be used to find the 3D locations of points in space from 2D positions gleaned from images captured from a camera with known pose and calibration information. Camera pose information relates to a camera's rotation and translation from a fixed origin. Camera calibration information can define linear and nonlinear intrinsic camera parameters encompassing focal length, image sensor format, principal point, and lens distortion. SfM may rely on triangulation to provide 3D points representative of distances to objects in a surrounding scene. The computations involved in performing triangulation can account for a significant fraction of the overall SfM compute cycle.

Single instruction, multiple data (SIMD) parallel computer processors use multiple processing elements to perform the same operation on multiple data points simultaneously.

SUMMARY

This disclosure relates to systems and methods for obtaining structure from motion (SfM) in vehicles. The disclosed systems and methods use a novel technique to provide 3D information with greater computational efficiency. Processing time can be further reduced through maximum utilization of SIMD processing capability. The resultant faster processing can enable an improved vehicle navigation or safety system capable of greater vehicle safety and lower power consumption.

In an example, a vehicular structure from motion (SfM) system can include an input to receive a sequence of image frames acquired from a camera on a vehicle, and a computer processor to process 2D feature point input data extracted from the image frames so as to compute 3D points corresponding to the 2D feature point data, each 3D point comprising 3D-coordinate output data. For a given 3D point the SfM system can be programmed to prepare initial A and b matrices based on 2D feature point input data associated with the given 3D point and camera pose information. The SfM system can then calculate partial $A^TA$ and partial $A^Tb$ matrices, based on the A and b matrices, respectively, outside of an iterative triangulation loop.

Within the iterative triangulation loop, the SfM system can compute $A^TA$ and $A^Tb$ matrices based on the partial $A^TA$ and partial $A^Tb$ matrices. Also within the loop, the system can compute an estimate of 3D coordinate output data for the given 3D point, based on the $A^TA$ and $A^Tb$ matrices. The SfM system can also compute a weight for each of a plurality of 2D feature points and scale the rows of the partial $A^TA$ and partial $A^Tb$ matrices by corresponding squares of the computed weights, within the loop.

In another example, a method for SfM-based control of a vehicle can begin with acquiring, from a camera on a vehicle, a sequence of image frames. Then, initial A and b matrices can be prepared based on 2D feature point input data associated with a given 3D point and camera pose information. Partial $A^TA$ and partial $A^Tb$ matrices can be calculated based on the A and b matrices, respectively, outside of an iterative triangulation loop.

The method can continue, within the iterative triangulation loop, by computing $A^TA$ and $A^Tb$ matrices based on the partial $A^TA$ and partial $A^Tb$ matrices. Based on the $A^TA$ and $A^Tb$ matrices, an estimate of 3D-coordinate output data for the given 3D point can be computed. A weight for each of a plurality of 2D feature points can be computed, and the rows of the partial $A^TA$ and partial $A^Tb$ matrices can be scaled by corresponding squares of the computed weights. Because each pair of rows in matrices A and b correspond to a single captured frame, each pair of rows in the partial $A^TA$ and $A^Tb$ matrices can be scaled by the same weight. The loop may terminate only upon completed a predefined number of iterations, rather than, for example, performing the computationally intensive task of comparing the change in weights from one iteration of the loop to the next against a threshold. This feature is further beneficial because, where multiple tracks are worked together, a weight change for one track may meet a threshold condition while a weight change for another track may not meet the threshold condition. Terminating the loop only after a predefined number of iterations avoids a need to address such ambiguity.

A 3D point cloud based on the estimate of 3D-coordinate output data can then be delivered to a controller that can control the vehicle based on the 3D point cloud.

In yet another example, a method can include acquiring, from a camera on a vehicle, a sequence of image frames. Then, from the sequence of image frames, a plurality of tracks can be determined, each track comprising a plurality of 2D feature points, each track associated with a 3D point, and each track having a size equal to the number of 2D feature points in the track. A set of initial values can be computed based on 2D feature points in a given track and on camera pose information, the set of initial values corresponding to A and b matrices for use in solving a matrix equation for the coordinates of the 3D point associated with the given track.

The method can continue with calculating a first set of reusable values corresponding to only partial calculation of unique elements of an $A^TA$ matrix representative of the matrix product of the transpose of the A matrix with the A matrix, and a second set of reusable values corresponding to only partial calculation of unique elements of an $A^Tb$ matrix representative of the matrix product of the transpose of the A matrix with the b matrix. The calculating of the sets of reusable values can be based on the set of initial values, and can be performed outside of an iterative triangulation loop.

The sets of reusable values can be stored in data memory that is arranged in rows and columns. The number of rows used for storing the first set of reusable values can correspond to the number of unique elements in the $A^TA$ matrix, while the number of columns used for storing the first set of reusable values can correspond to the size of the given track. Similarly, the number of rows used for storing the second set of reusable values can correspond to the number of unique elements in the $A^Tb$ matrix, while the number of columns used for storing the second set of reusable values can correspond to the size of the given track.

The method can continue, within the iterative triangulation loop, by computing, based on the reusable values, updatable values corresponding to unique elements of the $A^TA$ and $A^Tb$ matrices, and storing the updatable values in data memory. Inverse values corresponding to unique elements of an inverse matrix $(A^TA)^{-1}$ can be computed based on the updatable values, and can be stored in data memory. Solution values corresponding to the 3D coordinates of the 3D point associated with the given track can be computed based on the inverse values and the updatable values corresponding to unique elements of the $A^Tb$ matrix. The loop can repeat the computing of the updatable values, the inverse values, and the solution values in the without recalculating the reusable values except to scale them.

Any of the examples can take maximum advantage of SIMD processing with particular arrangements of the elements of the matrices, or the corresponding reusable values, updatable values, inverse values, and solution values, in memory.

BRIEF DESCRIPTION OF THE DRAWINGS

FIG. 3 illustrates an example method for solving SfM triangulation with a matrix equation.

FIG. 4 shows an example two-frame track equation.

FIG. 5 shows the form of an example matrix A.

FIG. 6 shows the unique elements of the transpose product matrix $A^TA$ of the example matrix A from FIG. 5.

FIG. 9 shows the form of an example partial $A^TA$ matrix.

FIG. 10 shows a rearrangement of the elements of the matrix of FIG. 9.

DETAILED DESCRIPTION

Systems and methods are described for providing computationally-efficient triangulation as used in determining three-dimensional (3D) structures from sequences of two-dimensional (2D) images acquired from a vehicle. The systems and methods of the current disclosure can provide a dense 3D reconstruction of a scene with improved computational efficiency. Such a capability is useful, for example, in automotive scenarios involving automated vehicle navigation, driver-assisted safety features, or park assist applications, which may rely on one or more of free-space detection, obstacle detection, and robust time-to-collision (TTC) estimation.

Triangulation is one of the major contributors in overall SfM performance. Thus, optimal implementation of triangulation methods is important for overall SfM system performance. Particularly, triangulation methods capable of being implemented in SIMD processors, and taking maximum advantage of the parallel processing capabilities of such processors, can improve SfM performance, and are disclosed herein.

Figure 1:
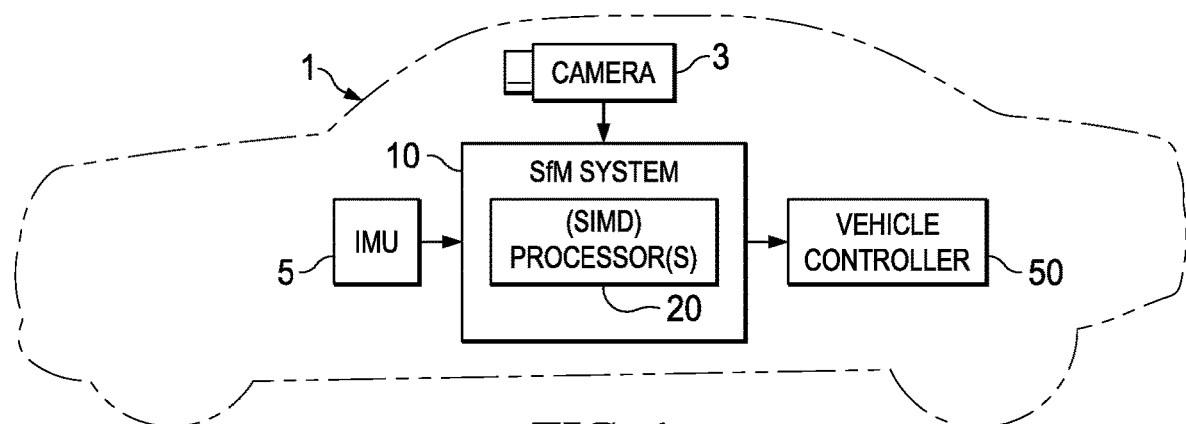
FIG. 1 shows an example structure from motion (SfM) system used for vehicular control.

In an example system like that shown in FIG. 1, camera 3 can be mounted to vehicle 1 to deliver image frames to SfM system 10. Vehicle 1 is illustrated as an automobile but can be any kind of vehicle, including watercraft, aircraft, or other types of land vehicles. Camera 3 can be mounted anywhere on the vehicle, including behind a windshield, or within the front, rear, or side body. SfM system 10 may also be fed information about the travel of vehicle 1 by inertial measurement unit (IMU) 5, which may comprise, for example, a 3D accelerometer and gyroscope and/or a speedometer.

SfM system 10 generates depth information about the surrounding scene, which may be, for example, in the form of 3D point clouds indicative of distances to obstacles, hazards, and/or targets. The 3D point clouds can comprise a plurality of 3D points, i.e., 3D-coordinate output data. SfM system 10 delivers such information to vehicle controller 50, which uses the depth information to activate or deactivate vehicle control systems that can include propulsion systems, braking systems, steering or maneuvering systems, safety or restraint systems (e.g, seat belts, airbags, powered windows, and door locks), signaling systems (e.g., turn signals, blinker lights, horns, and sirens), and communication systems. Vehicle controller 50 may also be fed information from other sensor systems such as radar- or lidar-based detection systems and/or from manual piloting controls.

The controller 50 may be implemented wholly as a hardware controller or may comprise both hardware and software components. One example of such a controller, or a component thereof, is a forward collision warning controller that can generate signals to do one or more of delivering an alert signal to a driver, steer the vehicle, activate breaking systems, and prime collision safety systems such as restraints or airbags, or perform other actions so as to avert a detected probable or imminent vehicular collision or mitigate the consequences of the detected collision. Another example of such a controller, or a component thereof, is a lane change warning controller that can detect if a vehicle is straying from its lane or if an intended lane change would result in a collision, and then generate signals to do one or more of the above-listed actions so as to achieve the above-mentioned result.

SfM system 10 can be equipped with one or more processors 20. As examples, the one or more processors 20 can comprise one or more vision processors to detect 2D feature points and generate flow tracks, and one or more digital signal processors (DSPs) to perform such tasks as computation of a fundamental matrix, estimation of the pose of the camera 3, and 3D triangulation to compute 3D points.

Figure 2:
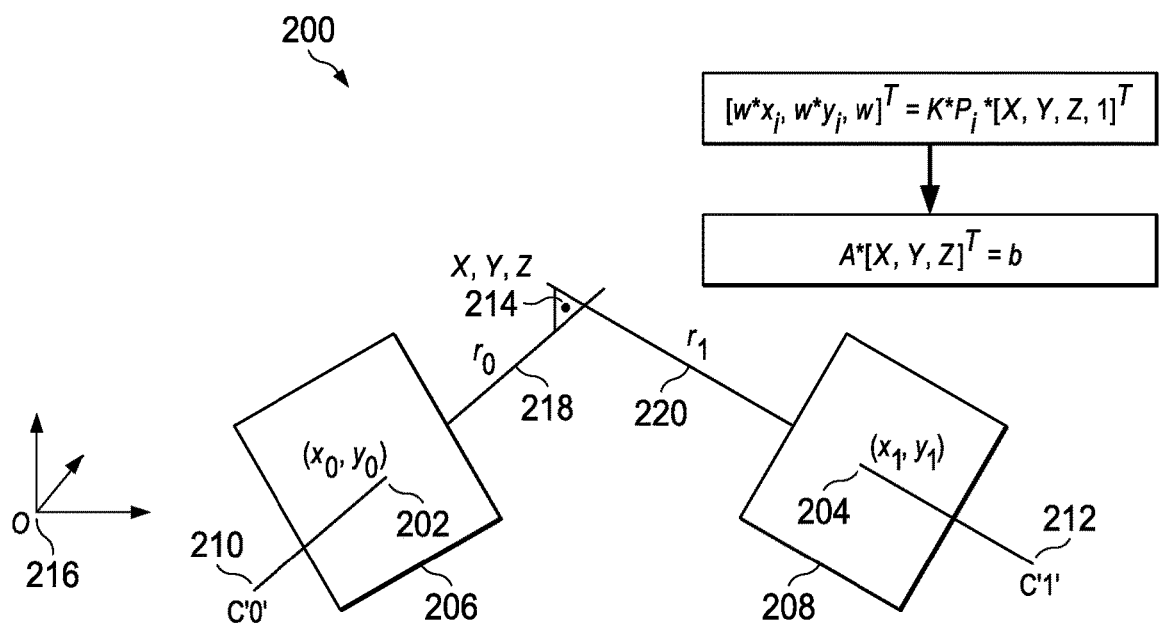
FIG. 2 is a diagram illustrating triangulation for SfM.

An example of such triangulation 200, used to generate depth information from different frames, is illustrated in FIG. 2. For this purpose, as shown in FIG. 1, the processor(s) 20 of SfM system 10 can be or can comprise one or more SIMD processor(s) for more efficient computation of the matrix data that is typical of triangulation calculations. An example of a suitable SIMD processor is the C66× multicore DSP manufactured by Texas Instruments Incorporated.

In FIG. 2, two 2D points 202, 204, designated as $(x_0, y_0)$ and $(x_1, y_1)$, respectively, are detected from two 2D image frames 206, 208 captured from different camera locations C'0' 210 and C'1' 212. The points 202, 204 are representative of the 2D positions of the same point 214 in 3D space, which point is designated as (X,Y,Z) in FIG. 2. More than two points corresponding to the same point 214 can be detected from more than two image frames, and all of these points can be used to improve the triangulation, but at least two points 202, 204 are necessary.

$P_i$, the pose information for the $i^{th}$ frame, describes the relative position, in terms of both rotation and translation, of the camera from origin O 216. In the illustrative examples that follow, this pose information is assumed to be known for both camera positions 210, 212. The pose information $P_i$ for the $i^{th}$ camera position can be represented, for example, as a 3×4 matrix. Camera calibration parameters K are also known and can be represented, for example, as a 3×3 matrix. Hereinafter, for the sake of simplicity and except where context indicates otherwise, $P_i$ should be understood to refer to the pose information as adjusted by camera calibration parameters, i.e., $KP^i$.

Rays $r_0$ 218 and $r_1$ 220 are 3D rays originating from the camera centers 210, 212 of their respective image frames 206, 208 and passing through points 202, 204, respectively. Algorithmic assumptions in feature detection, such as corner detection, and optical flow may introduce noise in the 2D positions of feature points 202, 204. Thus, as shown in FIG. 2, typically, rays $r_0$ 218 and $r_1$ 220 do not intersect precisely at common point in space 214. An iterative linear method can be used to find the best estimate of (X,Y,Z) 214, according to the equation:

$$[w*x_i, w*y_i, w]^T = K*P_i[X,Y,Z,1]^T$$

or, equivalently:

$$A*[X,Y,Z] = b$$

where:

$$w = P[2][.]*[X,Y,Z,1.0]^T$$

In the above equation, the notation P[2][.] is meant to refer to a complete row of matrix P.

FIG. 3 shows an example 300 of an equation used in an iterative linear method along with its inputs and outputs. Along with pose information $P_i$ 302, which is a 3×4 matrix in the illustrated example, one 2D feature point (x,y) 304 produces two rows 306 of the matrices A, b as shown. Three variables are unknown—the three coordinates of 3D point (X,Y,Z) 214. Thus, the illustrated matrix equation $A[X,Y,Z]^T = b$ cannot be solved from just one feature point location 304. A minimum of two locations of a 2D feature point 304 are needed to solve for X, Y, and Z. As camera 3 moves and generates multiple image frames 206, 208, etc., SfM system 10 may produce more than two feature points corresponding to a single 3D point in space. With each new image frame acquired, a new corresponding feature point may be detected, and thus the matrix equation of FIG. 3 may be updated 308 by filling in more feature points in the track, a single "track" consisting of the collection of 2D points from different image frames corresponding to a single 3D point. In matrices A and b, each new set of two rows correspond to a single image frame. Especially when more than two 2D points are available in a track, a satisfactory least squares solution can be found, resulting in the output of (X,Y,Z) 214.

An example two-frame track equation may thus be of the form 400 shown in FIG. 4, where the first two rows correspond to one image frame 206, and thus to camera position C'0' 210, while the second two rows correspond to a different image frame 208, and thus to camera position C'1' 212. In equation 400, $(x_0, y_0)$ is the feature point 202 in image frame 206, $(x_1, y_1)$ is the feature point 204 in image frame 208, $P_0$ is the 3×4 pose information matrix for camera C'0' 210, $P_1$ is the 3×4 pose information matrix for camera C'1' 212, $w_0$ is the weight corresponding to frame 206, and $w_1$ is the weight corresponding to frame 208. Weights $w_0$ and $w_1$ will both be equal to one in the first iteration of the iterative linear method, while from the second iteration onward, weights $w_i = P_i[2][.]*[X,Y,Z,1]^T$.

Equation 400 has simplified form $A[X,Y,Z]^T = b$ which may be solved for 3D point (X,Y,Z) 214 using the solution equation:

$$\begin{bmatrix} X \\ Y \\ Z \end{bmatrix} = (A^T A)^{-1} A^T b$$

where $A^T$ is the transpose of matrix A.

Thus, for example, where matrix A 500 is as shown in FIG. 5, the matrix product $A^T A$ 600 can be computed as shown in FIG. 6. Because not all of the matrix elements of $A^T A$ 600 are unique, only six unique matrix elements need to be computed, as shown in FIG. 6. FIG. 6 represents three non-unique matrix elements, which do not need to be computed, as empty spaces.

In some examples, the input and output values are of single-precision float data type. In some examples, the maximum length of a track can be assumed to be six feature points, so as to better accommodate processor data memory resources.

Figure 7:
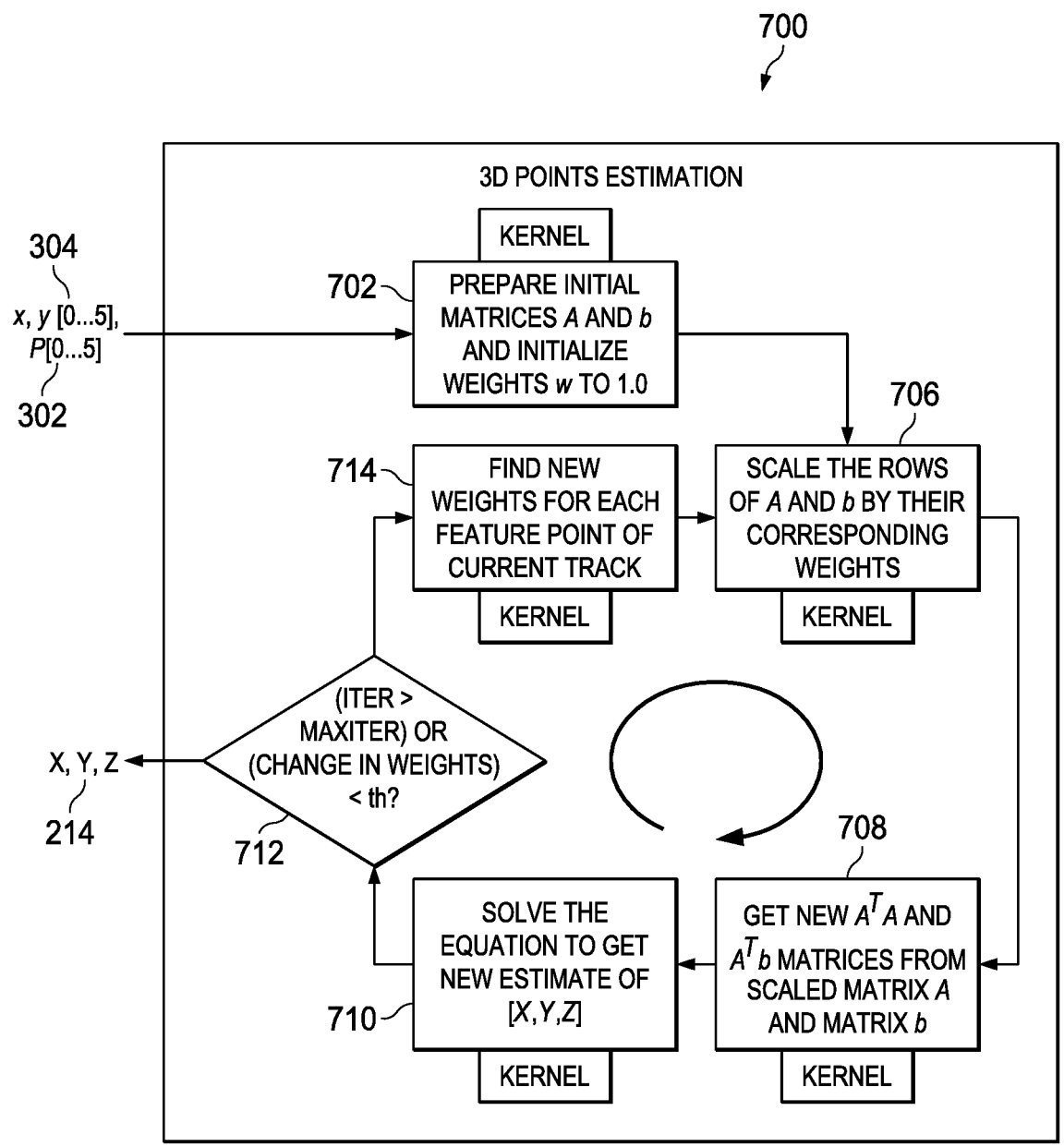
FIG. 7 is a flow diagram of an iterative linear triangulation method.

FIG. 7 illustrates an example triangulation method 700 in a flow diagram. In the example method 700 of FIG. 4, each track is processed at a time, and $A^T A$ and $A^T b$ matrices are calculated each iteration of the triangulation method 700. The method 700 begins with inputs 2D points 304 and pose information matrices 302. Initialization 702 is performed by preparing matrices A and b from the inputs and initializing weights w to a value of one. The iteration loop begins 706 by scaling the rows of A and b by their corresponding weights. Next, $A^T A$ and $A^T b$ matrices are computed 708, and the estimated location of the 3D point 214 is calculated by solving 710 the equation $A[X,Y,Z]^T = b$. After calculating $A^T b$ and $A^T b$ 708, $A^T A$ can be matrix-inverted and the resultant inverted matrix can be multiplied with $A^T b$ 710 to get the solution [X,Y,Z] 214.

The method terminates if 712 a maximum number of iterations has been performed or if the change in weights is less than a threshold, and the coordinates X, Y, Z of 3D point 214 are output. If, however, the termination condition 712 is not met, the loop continues with another iteration, beginning with finding new weights 714 for each feature point of the current track according to the weight equation given above. The rows of A and b are scaled 706 by their new weights, $A^TA$ and $A^Tb$ are calculated anew 708, the solution equation is solved again 710, and termination condition 712 is tested again.

Notably, the matrix A can change in each iteration of the triangulation method 700 as a fresh weight is calculated for each frame and that weight is used to scale matrix A and matrix b with corresponding frame-specific weights in each pair of rows of the equation 400. Resultantly, in method 700, $A^TA$ and $A^Tb$ matrix calculations are needed in each iteration of the method 700.

Figure 8:
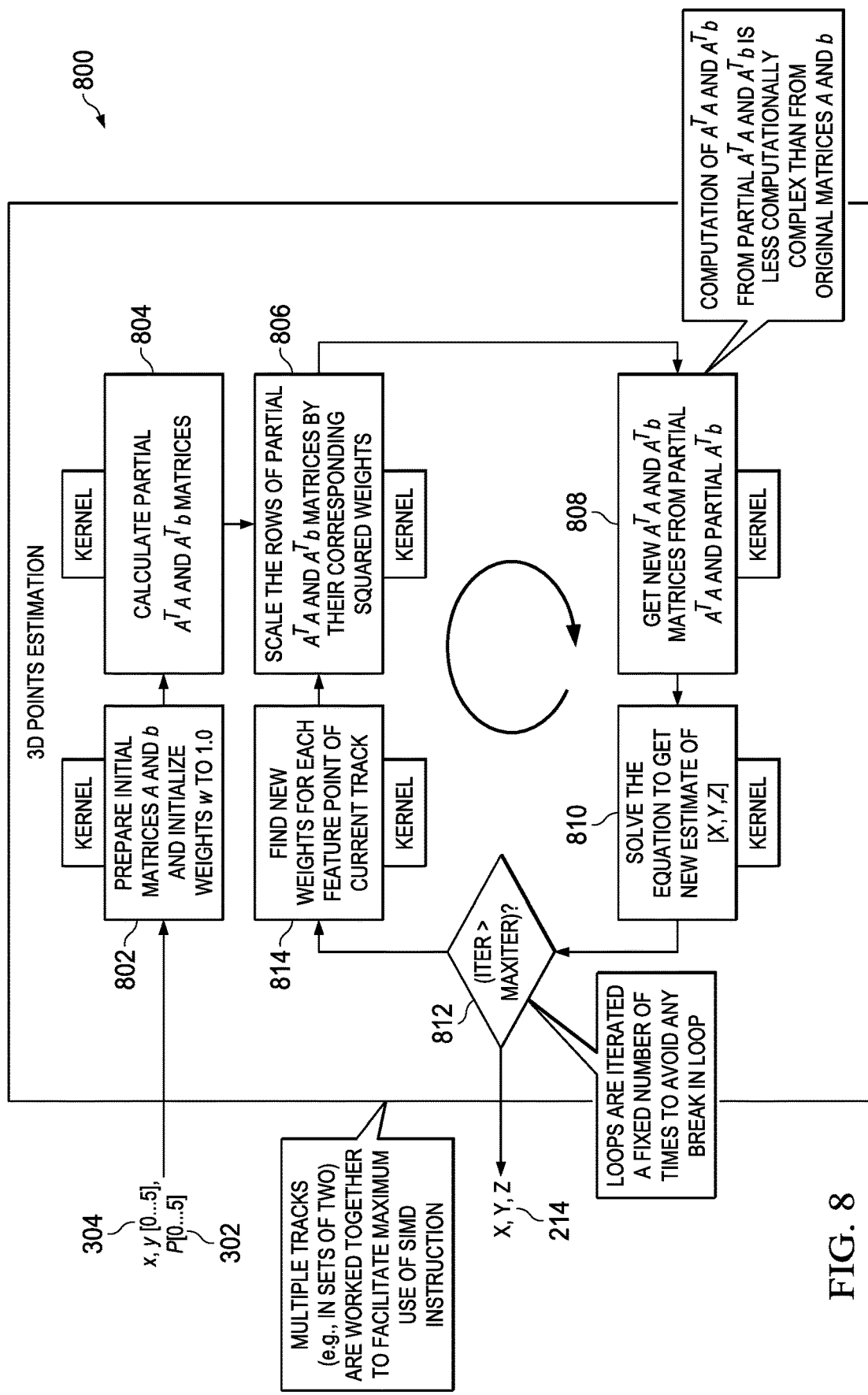
FIG. 8 is a flow diagram of an improved triangulation method wherein partial $A^TA$ and partial $A^Tb$ matrices are calculated outside the triangulation loop.

FIG. 8 illustrates an example triangulation method 800 in a flow diagram that is modified from method 700 in several key aspects. For example, in method 800, partial $A^TA$ and $A^Tb$ matrices are calculated 804 outside the iteration loop, and from those partial $A^TA$ and $A^Tb$ matrices, final scaled $A^TA$ and $A^Tb$ matrices are calculated inside the iteration loop. Calculation of scaled $A^TA$ and scaled $A^Tb$ matrices from original A and b matrices is more processor-resource consuming than performing such calculations from partially calculated $A^TA$ and $A^Tb$ matrices. The processor-resource savings as a result of this modification in method 800 is proportional to the number of core triangulation iterations.

With reference again to FIGS. 5 and 6, FIG. 5 shows original matrix A 500, and FIG. 6 shows the product $A^TA$ 600 of matrix A 500 with its transpose $A^T$. Matrix A 500 is for a track having just two feature points. A total of six unique elements must be calculated in $A^TA$ 600 irrespective of the track length, as it is a symmetric matrix. Non-unique entities in matrix $A^TA$ are shown as empty in FIG. 6. The size of the original matrix A 500 is 4×3, where the first two rows of the matrix A 500 are generated from one feature point 202 in one frame 206, and the next two rows of the matrix A 500 are generated from a corresponding feature point 204 in a different frame 208. In general, the size of matrix A 500 will be 2n×3, where n is the size of the track, as measured by the number of 2D feature points (202, 204, etc.) in the track. The size of the $A^TA$ matrix 600 is unchanged by the number of tracks generated, and thus in the present examples, will be always be 3×3.

In each iteration of triangulation method 700, a new weight w is calculated, and that weight can be used to scale the matrix A before calculating matrix $A^TA$ 600. The calculated weight is specific to a frame, and that frame-specific weight is used to scale corresponding rows in matrix A 500. In matrix A 500 shown in FIG. 5, only two frame feature points are present, hence matrix A 500 has four rows.

In method 700 of FIG. 7, matrix $A^TA$ 600 cannot be calculated 708 outside the iteration loop, as original matrix A 500 changes in each iteration. Hence $A^TA$ 600 will change in each iteration. However, in method 800 of FIG. 8, matrix $A^TA$ can be partially calculated 804 outside the core iteration loop. The partially computed $A^TA$ can be scaled 806 to calculate 808 the final $A^TA$ in each iteration of triangulation. Modifications 804 and 806 to method 700 result in a more computationally efficient method 800.

FIG. 9 shows partial $A^TA$ matrix 900, designated P_$A^TA$, that can be computed 804 outside the iteration loop as shown in FIG. 8. In the example shown, the size of P_$A^TA$ matrix 900 is 6×n, where n is the size of the track. Each row of P_$A^TA$ matrix 900 corresponds to one unique element of $A^TA$ matrix 600, and each column of P_$A^TA$ matrix 900 represents a corresponding frame component. The relationship between $A^TA$ matrix 600 and P_$A^TA$ matrix 900 is:

$$A^TA[i] = \sum_j w_j * \text{P\_}A^TA[i][j]$$

FIG. 10 illustrates a matrix 1000 having the twelve elements of P_$A^TA$ 900 arranged similarly to the six elements of $A^TA$ 600, as shown in FIG. 6, for comparison. In FIG. 10, each element of FIG. 6 is split into two elements only because the illustrated example shows performing triangulation based on information from only two frames. More generally, if information from i frames is used to perform the triangulation, then each element will be split into i elements.

A partial $A^Tb$ matrix, P_$A^Tb$, can be similarly computed 804 in method 800. As an example, for 4×3 matrix A:

$$\begin{bmatrix} a_{00} & a_{01} & a_{02} \\ a_{10} & a_{11} & a_{12} \\ a_{20} & a_{21} & a_{22} \\ a_{30} & a_{31} & a_{32} \end{bmatrix}$$

and 4×1 matrix b:

$$\begin{bmatrix} b_0 \\ b_1 \\ b_2 \\ b_3 \end{bmatrix}$$

where $A^Tb$ would be of the form:

$$\begin{bmatrix} a_{00}b_0 + a_{10}b_1 + a_{20}b_2 + a_{30}b_3 \\ a_{01}b_0 + a_{11}b_1 + a_{21}b_2 + a_{31}b_3 \\ a_{02}b_0 + a_{12}b_1 + a_{22}b_2 + a_{32}b_3 \end{bmatrix}$$

then the partial $A^Tb$ matrix P_$A^Tb$ as computed 804 in method 800 would be as follows:

$$\begin{bmatrix} a_{00}b_0 + a_{10}b_1 & a_{20}b_2 + a_{30}b_3 \\ a_{01}b_0 + a_{11}b_1 & a_{21}b_2 + a_{31}b_3 \\ a_{02}b_0 + a_{12}b_1 & a_{22}b_2 + a_{32}b_3 \end{bmatrix}$$

and the relationship between $A^Tb$ matrix 600 and P_$A^Tb$ matrix is:

$$A^Tb[i] = \sum_j w_j * \text{P\_}A^Tb[i][j]$$

As shown in FIG. 8, in the triangulation loop of method 800, after P_$A^TA$ and P_$A^Tb$ are calculated 804, the rows of these matrices can be scaled 806 by their corresponding squared weights. This process differs from the scaling 706 in the method 700 shown in FIG. 7. For example, for track size n=2, the scaled original matrix computed 706 would be of the form:

$$\begin{bmatrix} a_{00}/w_0 & a_{01}/w_0 & a_{02}/w_0 \\ a_{10}/w_0 & a_{11}/w_0 & a_{12}/w_0 \\ a_{20}/w_1 & a_{21}/w_1 & a_{22}/w_1 \\ a_{30}/w_1 & a_{31}/w_1 & a_{32}/w_1 \end{bmatrix}$$

In method 700, for an n-point track, the size of matrix A may be 2n×3. For at least some implementations, the scaling 706 may require 6n multiplication operations, 6n load operations, and 6n store operations. The $A^TA$ calculation 708 may require 12n multiplication operations, 24n load operations, 6 store operations, and (12n−6) addition operations. Assuming a total number M iterations are involved in the triangulation, the triangulation method 700 may require about 18Mn multiplications, 36Mn load/store operations, and 12Mn addition operations in total. Thus, for M=3 iterations, the triangulation method 700 may require, in total, 54n multiplications, 108n load/store operations, and 36n additions. The above figures address only the calculations related to matrices A and $A^TA$, not matrices b and $A^Tb$.

In method 800, however, $P\_A^TA$ can be scaled 806 as follows:

$$\begin{bmatrix} (a_{00}a_{00} + a_{10}a_{10})/(w_0w_0) & (a_{20}a_{20} + a_{30}a_{30})/(w_1w_1) & \ldots \\ \vdots & \vdots & \ldots \end{bmatrix}$$

In method 800, for an n-point track, the size of $P\_A^TA$ 900 can be 6×n. Each row of $P\_A^TA$ 900 can be scaled by a corresponding-frame squared weight and summed up to form one unique element of real $A^TA$ 600. The computation 804 of $P\_A^TA$ 900 can then require only 12n multiplication operations, 24n load operations, 6n store operations, and 6n addition operations. This calculation can be done outside the triangulation loop and need not be repeated with each iteration of the loop. Scaling 806 can require 6n multiplications, 6n load operations, and 6n store operations with each iteration of the loop. $A^TA$ calculation 808 can require no multiplications, 6n load operations, 6 store operations, and (6n−6) addition operations, indicative of a significant computational savings over $A^TA$ calculation 708 in method 700. The total triangulation cycle can require approximately (12n+6Mn) multiplications, (30n+18Mn) load/store operations, and (6n+6Mn) additions. For M=3 iterations, the triangulation method 800 can require, in total, approximately 30n multiplications, 84n load/store operations, and 24n additions.

The below table compares the computationally efficiency of method 700 with method 800, for computing the X, Y, Z values of a single 3D point 214, where M represents the total number of iterations in the triangulation loop and n is the size of a track:

| Computation | Method 700 | Method 800 |
|---|---|---|
| $P\_A^TA$ calculation | Not applicable | 12 n multiplications + 30 n load/store operations + 6 n additions |
| Scaling | 6 Mn multiplications + 12 Mn load/store operations | 6 Mn multiplications + 12 Mn load/store operations |
| Final $A^TA$ calculation | 12 Mn multiplications + (24 Mn + 6) load/store operations + (12 Mn − 6) additions | (6 Mn + 6) load/store operations + (6 Mn − 6) additions |
| Generic total | 18 Mn multiplications + 36 Mn load/store operations + 12 Mn additions | (6 Mn + 12 n) multiplications + (18 Mn + 30 n) load/store operations + (6 Mn + 6 n) additions |
| Specific total (M = 3, n = 5) | 270 multiplications + 540 load/store operations + 180 additions | 150 multiplications + 420 load/store operations + 120 additions |

As can be seen, for a three-iteration triangulation loop and a 5-frame track, method 800 consumes, per track, 120 fewer multiplication operations, 120 fewer load/store operations, and 60 fewer addition operations, as compared to method 700. The number of load/store operations may depend on the implementation, but even discounting such operations, method 800 results in a much more computationally efficient SfM system 10.

Figure 11:
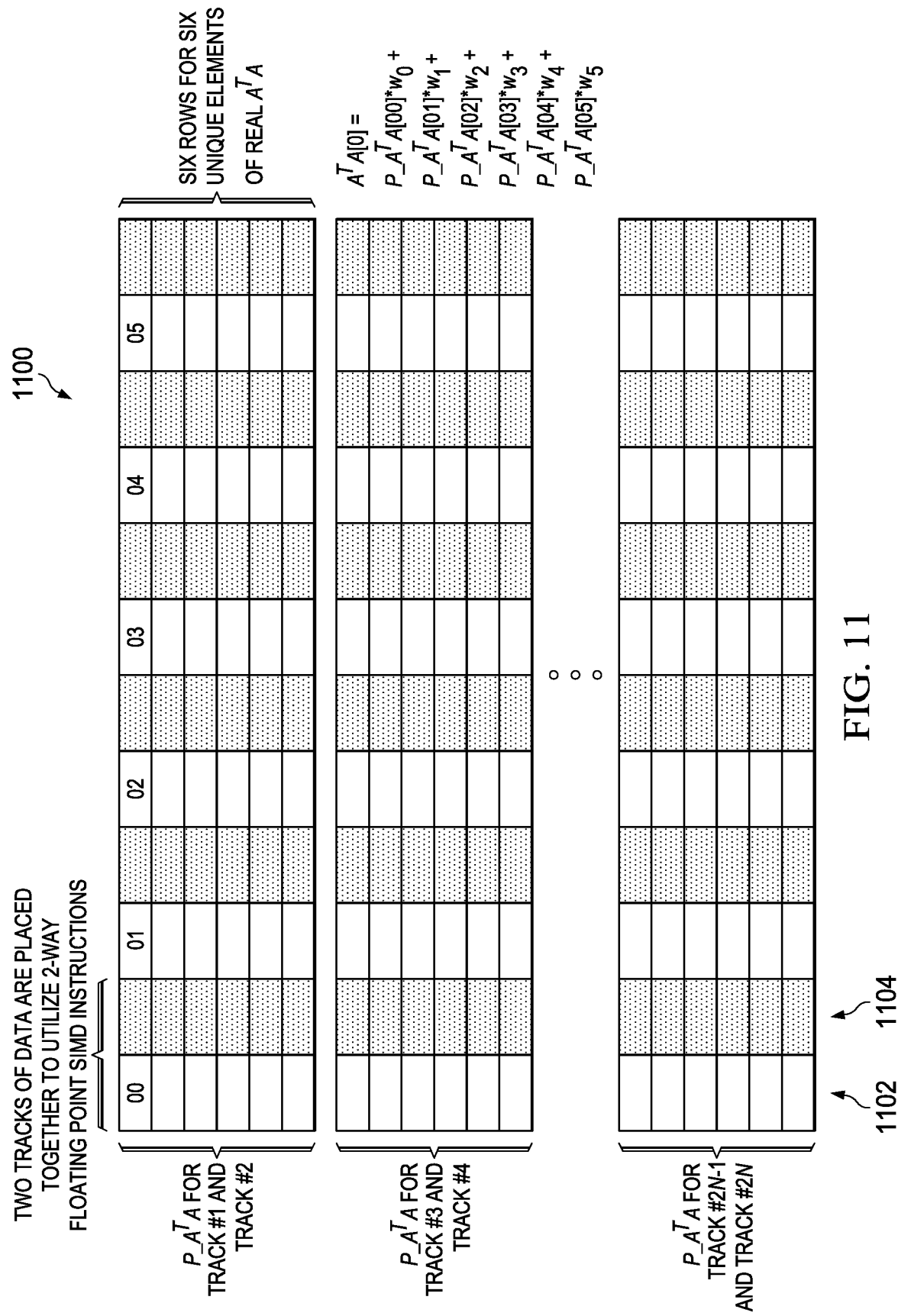
FIG. 11 depicts the data layout for partial $A^TA$ matrices in data memory.

FIG. 11 depicts the data layout 1100 for $P\_A^TA$ matrices in the data memory of an SIMD processor, such as processor 20 illustrated in FIG. 1. At the start of the triangulation process call, a number of tracks (2N in the illustrated example) can be supplied to an SIMD processor for processing. Two tracks of data can be interleaved and stored in the data memory of an SIMD processor for improved utilization of SIMD instructions. In FIG. 11, unshaded cells 1102 indicate even-numbered track data, whereas shaded cells 1104 indicate odd-numbered track data. Track size is assumed to be 6 in the illustrated example, resulting in the use of six columns for each track in data memory. The size of $P\_A^TA$ is 6×n for a single track, where n is the total number of feature points in the track. Interleaved $P\_A^TA$ size will thus be 6×2n, as data for two tracks is interleaved in the column direction.

A partial $A^Tb$ ($P\_A^Tb$) calculation may be arranged similarly. The size of matrix b is 2n×1, and after multiplication with $A^T$, the size of the product $A^Tb$ will be 3×1. Instead of calculating $A^Tb$ with every iteration in the triangulation loop, a partial $A^Tb$, $P\_A^Tb$, can be calculated 804 outside the loop, and can be used to compute a final $A^Tb$ from $P\_A^Tb$ with fewer processor cycles consumed with each iteration of the triangulation loop. The size of a single-track $P\_A^Tb$ will be 3×n, where n is the total number of feature points in the track.

Figure 12:
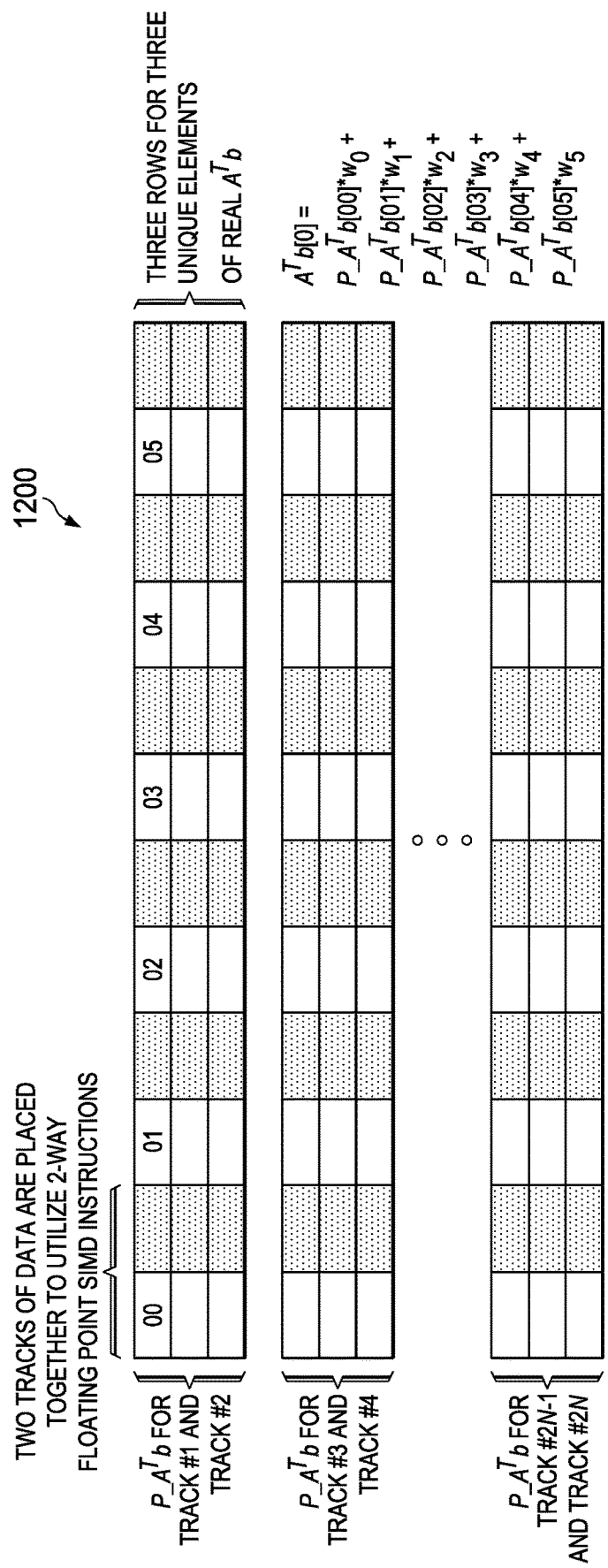
FIG. 12 depicts the data layout for partial $A^Tb$ matrices in data memory.

Just as shown in FIG. 11, $P\_A^Tb$ data can also be interleaved in SIMD data memory for two different tracks, as shown in layout 1200 illustrated in FIG. 12. The interleaving can be done column-wise, and after interleaving two tracks of $P\_A^Tb$ data, the data memory size of the two interleaved tracks becomes 3×2n.

FIGS. 13, 14, 15, and 16 show, respectively, the data layout 1300 for $A^TA$ matrices computed 808 in method 800, the data layout 1400 for the inversion of the $A^TA$ matrices, $(A^TA)^{-1}$, computed 810 in method 800, the data layout 1500 for $A^Tb$ matrices computed 808 in method 800, and the data layout 1600 for solution [X, Y, Z] computed 810 in method 800, each in the data memory of an SIMD processor. As discussed above with respect to the data layouts for computation of the other matrices, the data can be interleaved for different tracks. In each of FIGS. 11-16, 2N represents the total number of tracks computed together in single call of a kernel. N can be selected based on available internal data memory, i.e., internal to the SIMD processor. For example, N can be selected to be 10, for a total of twenty tracks computed together in a single call of a kernel.

FIGS. 11-16 depict 2-track data interleaving so as to take advantage of two-way floating point SIMD instructions, but depending on the architecture and data memory availability of the particular SIMD processor used, a number of tracks greater than two can be interleaved and operated on simultaneously. The number of tracks that can be interleaved depends on the SIMD capability of the device. More generally, a processor with W-way SIMD capability can interleave W tracks.

There may be many ways to solve the equation $A[X,Y,Z]^T=b$ where the size of A is, for example, 3×3 and the size of b is 3×1. Examples of such methods may include LU decomposition, singular value decomposition (SVD), QR decomposition, Cholesky decomposition, and inverse calculation, where $[X,Y,Z]^T=A^{-1}b$. The number of operations for inverse calculation-based methods may be higher than the number of operations required of other methods. Resultantly, inverse calculation-based methods are conventionally disfavored as "overkill."

However, it is observed herein that inverse calculation-based methods may be more favorable for SIMD implementations, because all operations involved in inverting a matrix can be calculated independently. In a cofactor based matrix calculation method, multiple cofactors and determinants of a matrix need to be calculated. In a cofactor based matrix inversion method, all the cofactors and determinant calculations are independent, i.e., they can be computed in parallel. Thus, there is no dependency on any other matrix inversion operation when calculating any element of an inverse matrix. In other methods for solving matrix equations, there is high degree of dependency upon certain calculation(s) in a method by other calculation(s) in the method.

In an example having n feature points in track, and where the size of the matrix A is 2n×3 and the size of b is 2n×1, after multiplying A by its transpose, the size of matrix A becomes 3×3, whereas the size of matrix b becomes 3×1:

$$\begin{bmatrix} a_{11} & a_{12} & a_{13} \\ a_{21} & a_{22} & a_{23} \\ a_{31} & a_{32} & a_{33} \end{bmatrix} \begin{bmatrix} X \\ Y \\ Z \end{bmatrix} = \begin{bmatrix} b_1 \\ b_2 \\ b_3 \end{bmatrix}$$

Matrix $A^TA$ being symmetrical, the inverse of A also will be symmetrical and only six elements need to be evaluated:

$$A^{-1} = \frac{1}{|A|} \begin{bmatrix} \begin{vmatrix} a_{22} & a_{23} \\ a_{32} & a_{33} \end{vmatrix} & \begin{vmatrix} a_{13} & a_{12} \\ a_{33} & a_{32} \end{vmatrix} & \begin{vmatrix} a_{12} & a_{13} \\ a_{22} & a_{23} \end{vmatrix} \\ \begin{vmatrix} a_{23} & a_{21} \\ a_{33} & a_{31} \end{vmatrix} & \begin{vmatrix} a_{11} & a_{13} \\ a_{31} & a_{33} \end{vmatrix} & \begin{vmatrix} a_{13} & a_{11} \\ a_{23} & a_{21} \end{vmatrix} \\ \begin{vmatrix} a_{21} & a_{22} \\ a_{31} & a_{32} \end{vmatrix} & \begin{vmatrix} a_{12} & a_{11} \\ a_{32} & a_{31} \end{vmatrix} & \begin{vmatrix} a_{11} & a_{12} \\ a_{21} & a_{22} \end{vmatrix} \end{bmatrix}$$

To maximize the usage of SIMD instructions, multiple tracks may be interleaved and worked together. As discussed above, in an implementation using the Texas Instruments C66x multicore digital signal processor, or any other SIMD processor that supports two-way SIMD of floating point data, the number of tracks to be interleaved may be chosen as two, and solutions for two tracks may be achieved simultaneously:

$$\begin{bmatrix} a_{11} & a_{12} & a_{13} \\ a_{21} & a_{22} & a_{23} \\ a_{31} & a_{32} & a_{33} \end{bmatrix} \begin{bmatrix} X_0 \\ Y_0 \\ Z_0 \end{bmatrix} = \begin{bmatrix} b_1 \\ b_2 \\ b_3 \end{bmatrix} \quad \begin{bmatrix} c_{11} & c_{12} & c_{13} \\ c_{21} & c_{22} & c_{23} \\ c_{31} & c_{32} & c_{33} \end{bmatrix} \begin{bmatrix} X_1 \\ Y_1 \\ Z_1 \end{bmatrix} = \begin{bmatrix} d_1 \\ d_2 \\ d_3 \end{bmatrix}$$

Thus the data arrangement in processor memory for a simultaneous SIMD solution of two equations, such as those above, can take the form:

| | | | | | | | | | |
|---|---|---|---|---|---|---|---|---|---|
| $a_{11}$ | $c_{11}$ | $a_{12}$ | $c_{12}$ | $a_{13}$ | $c_{13}$ | $X_0$ | $X_1$ | $b_1$ | $d_1$ |
| $a_{21}$ | $c_{21}$ | $a_{22}$ | $c_{22}$ | $a_{23}$ | $c_{23}$ | $Y_0$ | $Y_1$ | $b_2$ | $d_2$ |
| $a_{31}$ | $c_{31}$ | $a_{32}$ | $c_{32}$ | $a_{33}$ | $c_{33}$ | $Z_0$ | $Z_1$ | $b_3$ | $d_3$ |

An advantage of method 800 over method 700 is the splitting of the calculation of $A^TA$ and $A^Tb$ in such a way that some of the calculation can be offloaded outside the iteration loop. Hence, only a partial operation needs to be done inside the iteration loop in order to arrive at scaled $A^TA$ and $A^Tb$ matrices. Computational complexity in the iteration loop is thereby reduced. The comparative savings in processing time increases as the number of iterations in the triangulation loop increases.

Additionally, a cofactor based matrix inversion method to solve the equation $A[X,Y,Z]^T=b$ can be used to take advantage of the maximum SIMD capability of SIMD processors and to exploit the symmetrical nature of matrix A. An SIMD implementation of a cofactor based inverse calculation method can be chosen to make independent calculations.

Furthermore, the systems and methods described herein further improve computational efficiency by simultaneously processing multiple feature point tracks, the number processed simultaneously equal to the SIMD capability of the processor, facilitated by usage of SIMD instructions.

Still further, using a fixed number of iterations of the triangulation loop for each track, and terminating 812 the loop only when the fixed number of iterations has been completed, avoids the use of a break instruction in the triangulation loop. The elimination of the break instruction which, especially in the aggregate over a plurality of iterations, can computationally intensive, serves to further streamline the triangulation loop. It has been observed that there is no impact in the quality of the triangulation solution even if the solution is continued after reaching the break scenario where the change in weights from one iteration of the loop to the next is less than a threshold.

Yet another feature or benefit of the systems and methods described herein is that the specific data layout of input, intermediate, and output data, as shown and described above, including the interleaving of data for different tracks, facilitates the utilization of the maximum capability of SIMD processors, further improving efficiency.

The result of the combination of the above features is that triangulation computation performance is increased by reducing the number of processor cycles per image frame. In an example having 12,000 input tracks, the computational load can be reduced from approximately eighty megacycles per frame to approximately twenty megacycles per frame. The systems and methods described herein thus, for example, permit frame rates to be increased fourfold, or permit much lower power to be consumed in processing frames for SfM vehicle control.

Figure 17:
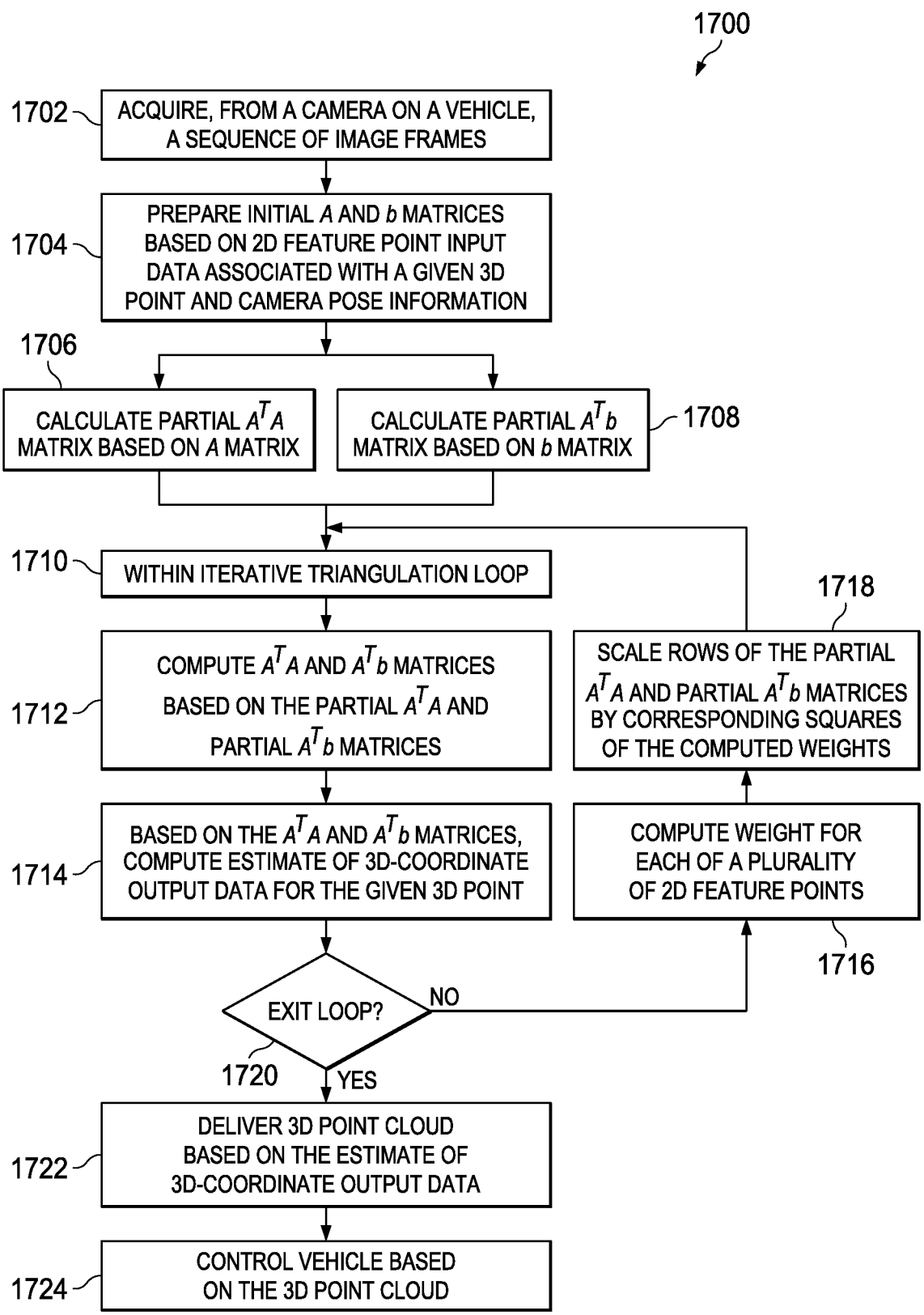
FIG. 17 is a flow chart showing an example triangulation method for vehicle control.

FIG. 17 presents a flow chart for a method 1700 in accordance with the present disclosure. A sequence of image frames can be acquired 1702, for example, from a camera on a vehicle, such as camera 3 on vehicle 1 in FIG. 1. 2D feature points can be determined from the image frames, and initial A and b matrices can be prepared 1704 based on 2D feature point input data associated with a given 3D point and camera pose information. The 2D feature point data can consist of coordinates, such as x, y coordinates, 202, 204, 304 in FIGS. 2 and 3, and the 3D point can be as illustrated as point 214 in FIG. 2. A computer processor can be used to calculate 1706, 1708 partial $A^TA$ and partial $A^Tb$ matrices, based on the A and b matrices, respectively, outside of an iterative triangulation loop. The partial $A^TA$ matrix can, for example, take the form illustrated as matrix 900 in FIG. 9, while the partial $A^Tb$ matrix may be of a similar form, as discussed previously in this disclosure. As illustrated, the calculation 1706, 1708 of these partial matrices can be done in parallel, since neither depends on calculation of the other.

Within the iterative triangulation loop 1710, $A^TA$ and $A^Tb$ matrices can be computed 1712 based on the partial $A^TA$ and partial $A^Tb$ matrices. An estimate of 3D-coordinate output data for the given 3D point can be computed 1714 based on the $A^TA$ and $A^Tb$ matrices. The estimate of the 3D-coordinate output data can be computed, for example, by calculating the matrix product of (a) the inverse of the $A^TA$ matrix and (b) the $A^Tb$ matrix. The inverse of the $A^TA$ matrix can be computed using an SIMD implementation of a cofactor based inverse calculation method.

A weight for each of a plurality of 2D feature points can be computed 1716, and the rows of the partial $A^TA$ and partial $A^Tb$ matrices can be scaled 1718 by corresponding squares of the computed weights. The loop can continue until an appropriate exit condition is reached 1720. For example, the iterative triangulation loop may be terminated only after a predetermined number of iterations and not by a comparison against a threshold of a value other than the number of iterations.

A 3D point cloud based on the estimate of 3D-coordinate output data can be delivered 1722, as to a vehicle controller, such as vehicle controller 50 illustrated in FIG. 1. The vehicle can then be controlled 1724 based on the 3D point cloud.

The method 1700 in FIG. 17 can further involve performing triangulation on multiple tracks simultaneously using SIMD instructions, each track consisting of a plurality of 2D feature points associated with a particular 3D point. For example, triangulation can be performed on two tracks simultaneously using SIMD instructions that are two-way floating point instructions.

Figure 18:
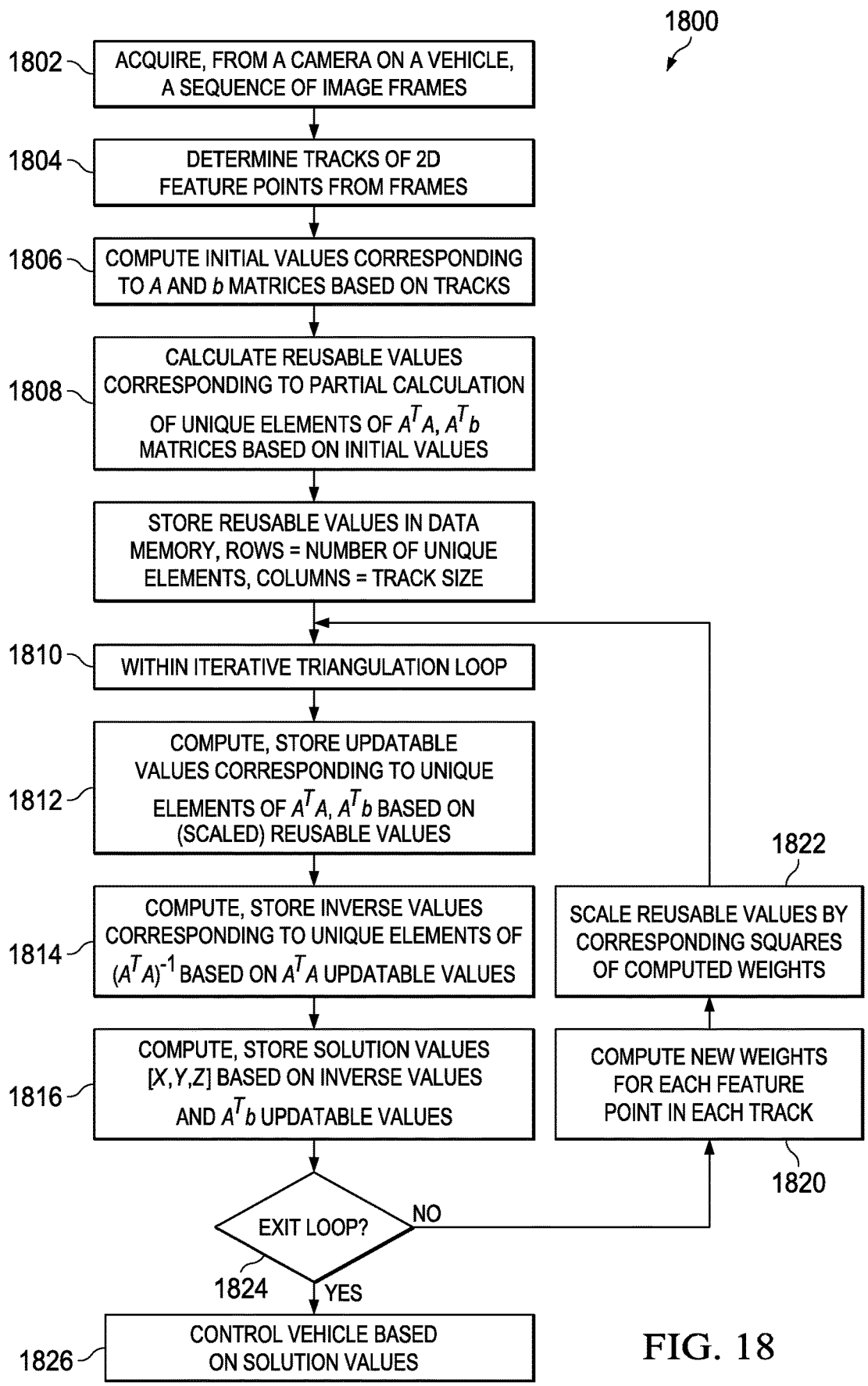
FIG. 18 is a flow chart showing another example triangulation method.

FIG. 18 presents a flow chart for a method 1800 in accordance with the present disclosure. A sequence of image frames can be acquired 1802, for example, from a camera on a vehicle, such as camera 3 on vehicle 1 in FIG. 1. A plurality of tracks each comprising a plurality of 2D feature points can be determined 1804 from the sequence of image frames, wherein each track is associated with a 3D point, and each track has a size equal to the number of 2D feature points in the track. A set of initial values can be computed 1806 based on 2D feature points in a given track and on camera pose information, the set of initial values corresponding to A and b matrices for use in solving a matrix equation for the coordinates of the 3D point associated with the given track. The 2D feature point data can consist of coordinates, such as x, y coordinates, 202, 204, 304 in FIGS. 2 and 3, and the 3D point can be as illustrated as point 214 in FIG. 2.

A first set of reusable values corresponding to only partial calculation of unique elements of an $A^TA$ matrix can be calculated 1806. The $A^TA$ matrix can be representative of the matrix product of the transpose of the A matrix with the A matrix. Additionally, and in some examples simultaneously (i.e., in parallel), a second set of reusable values corresponding to only partial calculation of unique elements of an $A^Tb$ matrix can be calculated 1806. The $A^Tb$ matrix can be representative of the matrix product of the transpose of the A matrix with the b matrix. The calculation 1806 of the sets of reusable values can be based on the set of initial values. The calculation 1806 of the reusable values can be performed outside of an iterative triangulation loop.

Further in method 1800, the sets of reusable values can be stored in data memory. The data memory can being arranged in rows and columns. The number of rows used for storing the first set of reusable values can correspond to the number of unique elements in the $A^TA$ matrix. The number of columns used for storing the first set of reusable values can correspond to the size of the given track. The number of rows used for storing the second set of reusable values can correspond to the number of unique elements in the $A^Tb$ matrix. The number of columns used for storing the second set of reusable values can correspond to the size of the given track. Such storage can be, for example, as illustrated in FIGS. 11 and 12.

Figure 13:
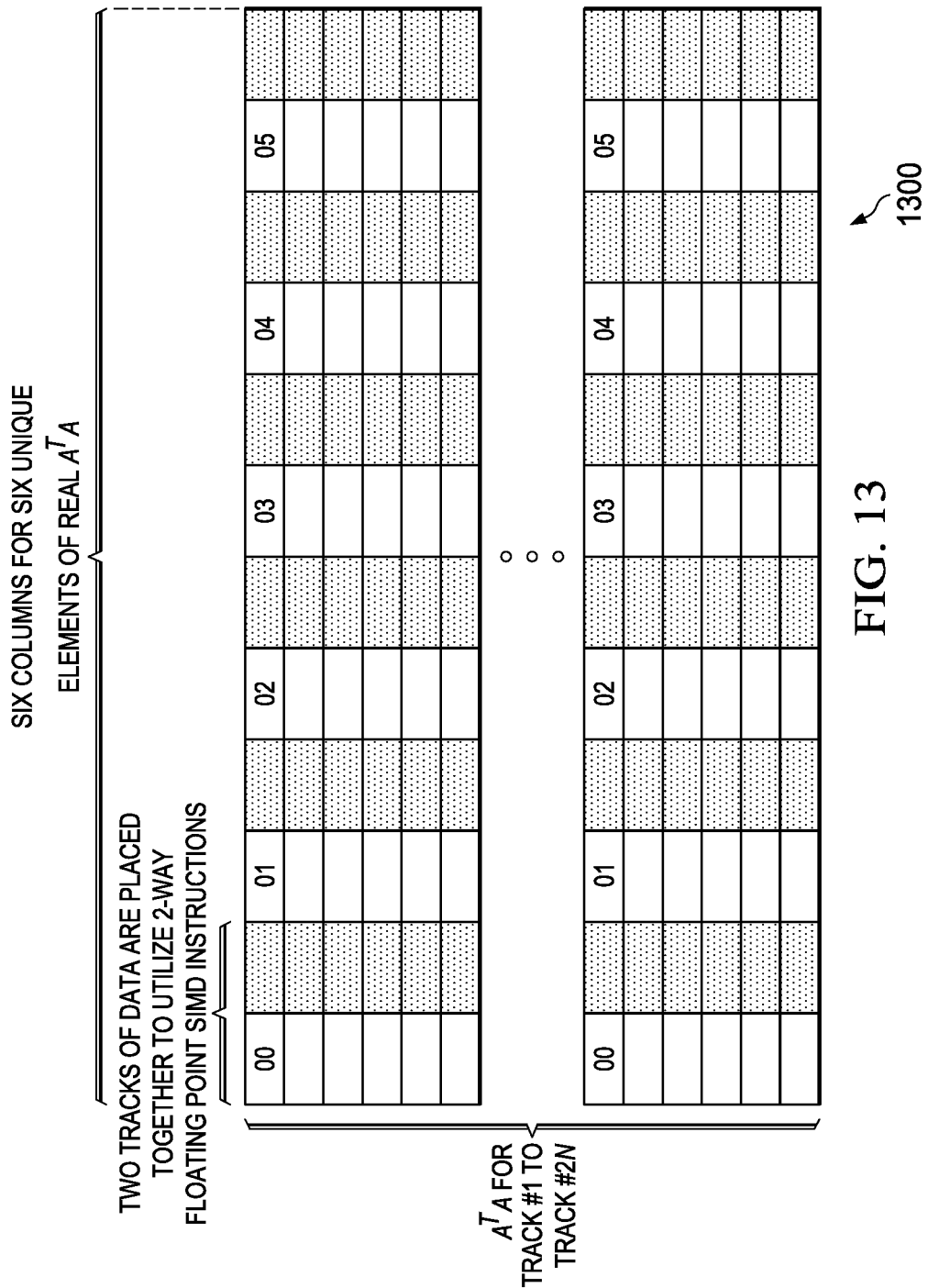
FIG. 13 depicts the data layout for $A^TA$ matrices in data memory.
Figure 14:
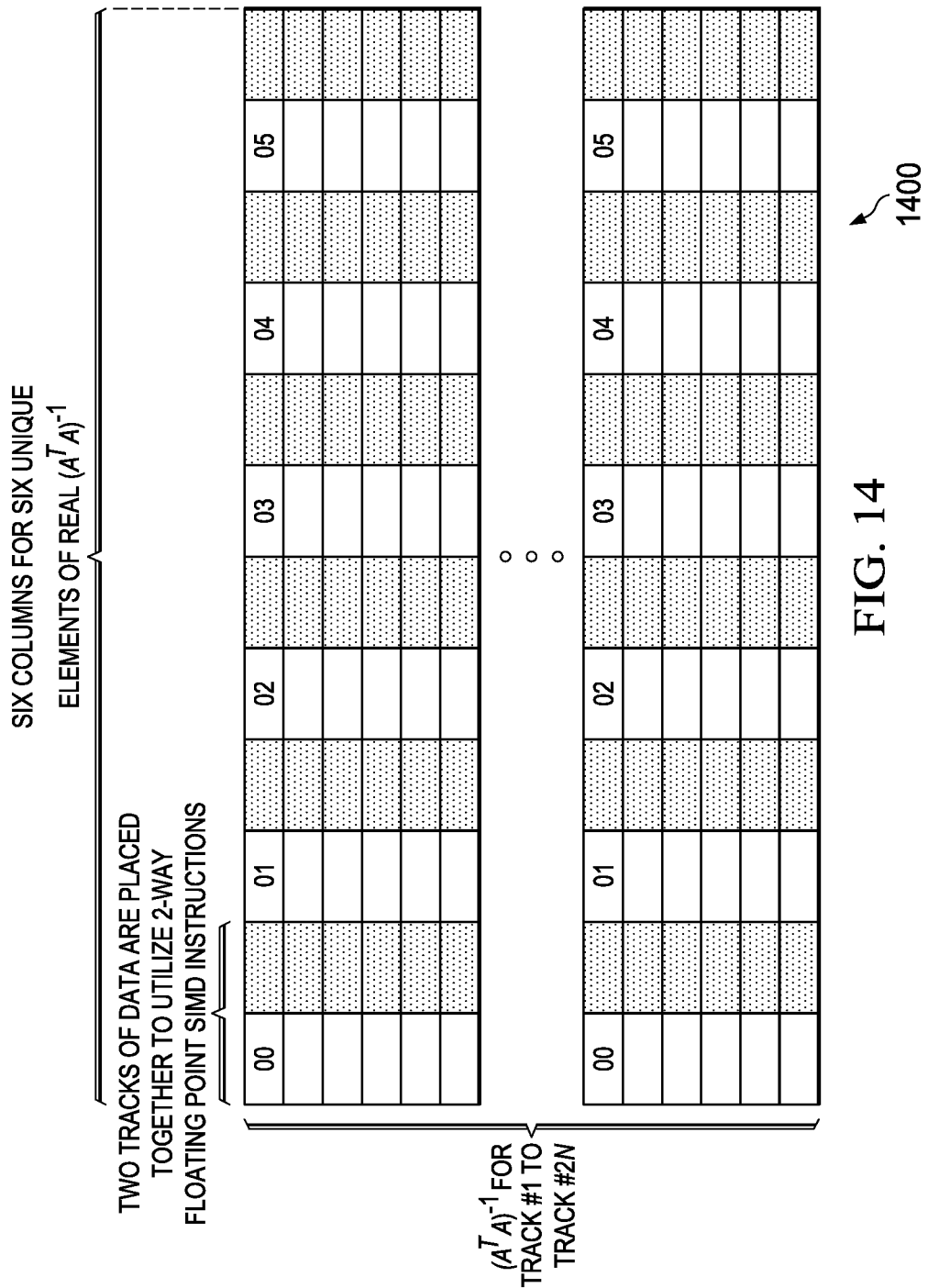
FIG. 14 depicts the data layout for $(A^TA)^{-1}$ matrices in data memory.
Figure 15:
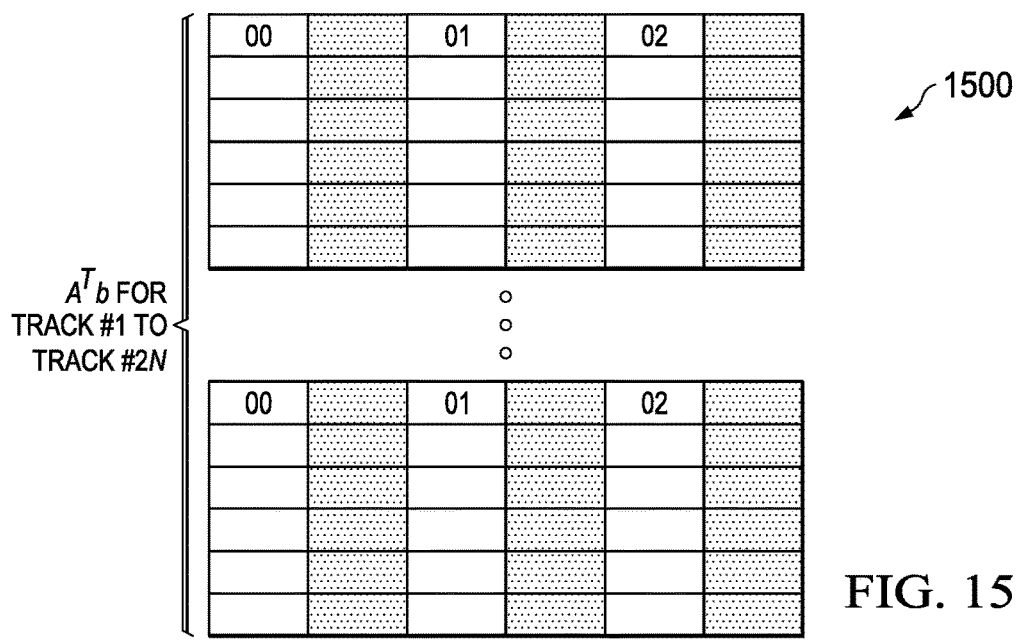
FIG. 15 depicts the data layout for $A^Tb$ matrices in data memory.

Within the iterative triangulation loop 1810 of method 1800, updatable values corresponding to unique elements of the $A^TA$ and $A^Tb$ matrices can be computed 1812 based on the reusable values. The computed updatable values can be stored in data memory in a similar fashion as the reusable values, for example, as illustrated in FIGS. 13 and 15. Based on the updatable values, and in particular on the $A^TA$ updatable values, i.e., on those updatable values that correspond to unique elements of the $A^TA$ matrix, inverse values corresponding to unique elements of an inverse matrix $(A^TA)^{-1}$ can be computed 1814. The inverse values can be computed, for example, using an SIMD implementation of a cofactor based inverse calculation method. The inverse values can be stored in data memory in a similar fashion as the reusable and updatable values, for example, as illustrated in FIG. 14.

Figure 16:
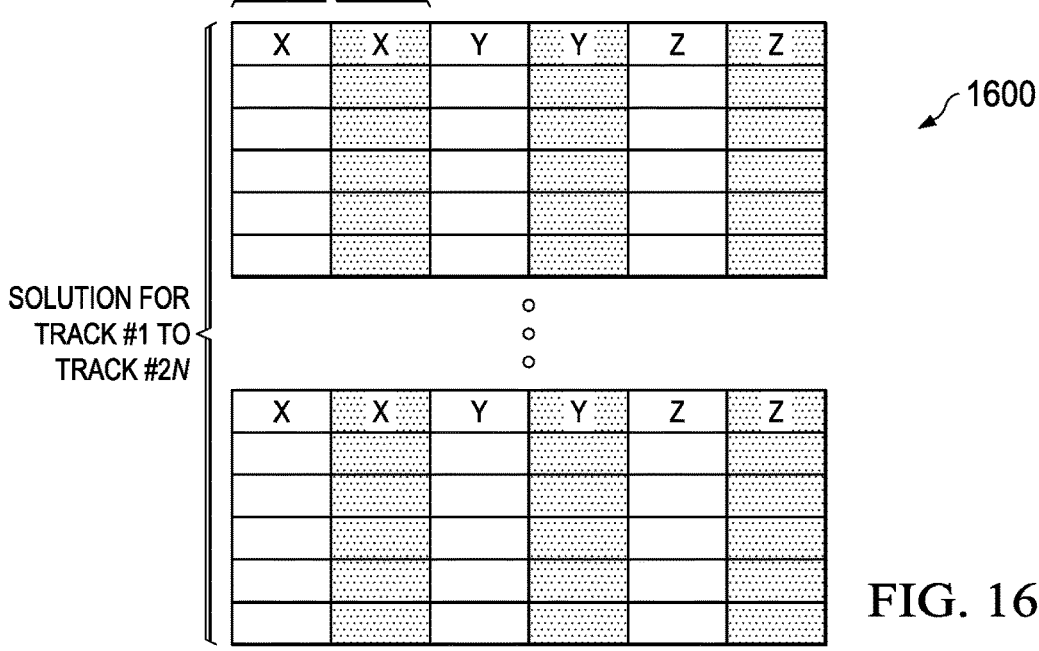
FIG. 16 depicts the data layout for solution matrices in data memory.

Based on the inverse values and the updatable values corresponding to unique elements of the $A^Tb$ matrix, solution values corresponding to the 3D coordinates of the 3D point associated with the given track can be computed 1816. The solution values can be of the form X, Y, Z, and can be stored in data memory in a similar fashion as the reusable, updatable, and inverse values, for example, as illustrated in FIG. 16.

The computing of the updatable values, the inverse values, and the solution values can be repeated in the iterative triangulation loop 1810 without recalculating the reusable values, except to scale them. For example, the reusable values can be scaled 1822 by corresponding squares of computed weights, which weights can be computed 1820 with each iteration of the loop 1810 for each feature point in each track. The computation 1820 of the weights and the scaling 1822 can be done as described earlier in this disclosure. The repeating of the computing 1812, 1814, 1816 of the updatable values, the inverse values, and the solution values may be performed a predetermined number of times that is not reduced by any calculation performed within the triangulation loop.

When a suitable termination condition for the loop is reached 1824, for example when the loop has completed a predetermined number of iterations, the solution values can be used, for example, to control a vehicle 1826.

The data memory used to store the reusable values, the updatable values, the inverse values, and the solution values can be an SIMD data memory, for example, as illustrated in FIGS. 11-16. The reusable values, the updatable values, the inverse values, and the solution values associated with the given track can each be stored in the data memory as interleaved, column-wise, with reusable values, updatable values, inverse values, and solution values associated with a different track, for example, as illustrated in FIGS. 11-16. The computing of at least one set of values associated with the given track can be performed simultaneous to computing of a corresponding set of values associated with the different track using SIMD instructions.

Each step of determining, computing, or calculating in the methods 1700 and 1800 in FIGS. 17 and 18 may be performed using a computer processor. A different processor or processor core may be used for each step, or the same processor or core may be used for multiple of the steps, or for all of the steps. For maximum efficiency and speed, those steps that can be performed in parallel, by virtue of lack of dependence on one another, should be performed simultaneously using different processors or cores, or otherwise using routines for parallel processing, such with SIMD processors and instructions to parallelize the processing of data.

While this disclosure has discussed its methods and systems in terms of monocular examples (i.e., involving a single camera), a structure-from-motion system can use multiple cameras and/or multiple processing systems to derive depth information about the surrounding scene. For example, multiple outward-facing cameras may be placed about the perimeter of a vehicle so as to acquire 2D information about the surrounding scene from multiple directions. Such information can then be processed by an SfM system, or multiple SfM systems running in parallel, and the resultant 3D data can be merged into a single representation or understanding of the surrounding scene. In some examples, multiple cameras may be placed such that front peripheral vision is provided. In other examples, complete 360-degree view of the surrounding environment can be captured and processed, thereby eliminating "blind spots" in the system.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
an input to receive a sequence of image frames from a camera on a vehicle; and
a computer processor coupled to the input and configured to:
determine 2D feature point input data associated with a 3D point from the image frames;
prepare initial A and b matrices based on the 2D feature point input data, wherein each pair of rows of the initial A and b matrices corresponds to a respective image frame in the sequence of image frames;
calculate partial $A^TA$ and partial $A^Tb$ matrices based on the A and b matrices, respectively;
compute $A^TA$ and $A^Tb$ matrices based on the partial $A^TA$ and partial $A^Tb$ matrices;
based on the $A^TA$ and $A^Tb$ matrices, compute an estimate of 3D-coordinate output data for the 3D point;
compute a weight for each of a plurality of 2D feature points; and
scale rows of the partial $A^TA$ and partial $A^Tb$ matrices by corresponding squares of the computed weights;
wherein the estimate of the 3D-coordinate output data is computed by calculating a matrix product of (a) an inverse of the $A^TA$ matrix and (b) the $A^Tb$ matrix, and wherein the inverse of the $A^TA$ matrix is computed using an SIMD implementation of a cofactor based inverse calculation method.

2. The system of claim 1,
wherein the computing $A^TA$ and $A^Tb$ matrices, the computing an estimate, the computing a weight, and the scaling are performed within an iterative triangulation loop, and wherein the iterative triangulation loop is terminated only after a predetermined number of iterations.

3. The system of claim 1, wherein the estimate of the 3D-coordinate output data is computed by calculating the matrix product of (a) the inverse of the $A^TA$ matrix and (b) the $A^Tb$ matrix.

4. The system of claim 1, wherein the computer processor is a single-instruction, multiple-data (SIMD) processor.

5. The system of claim 4,
wherein the preparing, the calculating, the computing $A^TA$ and $A^Tb$ matrices, the computing an estimate, the computing a weight, and the scaling together comprise a triangulation, and
wherein the system performs the triangulation on multiple tracks simultaneously using SIMD instructions, each track consisting of a plurality of 2D feature points associated with the 3D point.

6. The system of claim 5, wherein the triangulation is performed on two tracks simultaneously, and the SIMD instructions are two-way floating point instructions.

7. The system of claim 5, wherein data corresponding to the multiple different tracks is interleaved column-wise in a data memory of the SIMD processor.

8. The system of claim 1, wherein the partial $A^TA$ matrix has a number of rows corresponding to a number of unique elements in the $A^TA$ matrix and a number of columns corresponding to a number of 2D feature points used as the 2D feature point input data.

9. A method comprising:
acquiring, from a camera on a vehicle, a sequence of image frames;
preparing initial A and b matrices based on 2D feature point input data associated with a 3D point, wherein each pair of rows of the initial A and b matrices corresponds to a respective image frame in the sequence of image frames;
calculating, with a computer processor, partial $A^TA$ and partial $A^Tb$ matrices based on the A and b matrices, respectively;
computing $A^TA$ and $A^Tb$ matrices based on the partial $A^TA$ and partial $A^Tb$ matrices;
based on the $A^TA$ and $A^Tb$ matrices, computing an estimate of 3D-coordinate output data for the given 3D point;
computing a weight for each of a plurality of 2D feature points; and
scaling rows of the partial $A^TA$ and partial $A^Tb$ matrices by corresponding squares of the computed weights;
deliver a 3D point cloud based on the estimate of 3D-coordinate output data to a controller; and
controlling the vehicle based on the 3D point cloud;
wherein the estimate of the 3D-coordinate output data is computed by calculating a matrix product of (a) an inverse of the $A^TA$ matrix and (b) the $A^Tb$ matrix, and wherein the inverse of the $A^TA$ matrix is computed using an SIMD implementation of a cofactor based inverse calculation method.

10. The method of claim 9, wherein the computing $A^TA$ and $A^Tb$ matrices, the computing an estimate, the computing a weight, and the scaling are performed within an iterative triangulation loop, and
wherein the iterative triangulation loop is terminated only after a predetermined number of iterations.

11. The method of claim 9, wherein the estimate of the 3D-coordinate output data is computed by calculating the matrix product of (a) the inverse of the $A^TA$ matrix and (b) the $A^Tb$ matrix.

12. The method of claim 9,
wherein the preparing, the calculating, the computing $A^TA$ and $A^Tb$ matrices, the computing an estimate, the computing a weight, and the scaling together comprise a triangulation,
further comprising performing the triangulation on multiple tracks simultaneously using SIMD instructions, each track consisting of a plurality of 2D feature points associated with a particular 3D point.

13. The method of claim 12, wherein the triangulation is performed on two tracks simultaneously, and the SIMD instructions are two-way floating point instructions.

14. A method comprising:
acquiring, from a camera on a vehicle, a sequence of image frames;
determining, from the sequence of image frames, a plurality of tracks, wherein each track in the plurality of tracks comprising a respective plurality of 2D feature points, each track in the plurality of tracks is associated with a respective 3D point, and each track in the plurality of tracks having a size equal to a number of respective 2D feature points in the track,
computing, with a computer processor, a set of initial values based on the respective 2D feature points in a given track and on camera pose information, the set of initial values corresponding to A and b matrices for use in solving a matrix equation for coordinates of the 3D point associated with the given track, wherein each pair of rows of the initial A and b matrices corresponds to a respective image frame in the sequence of image frames;
calculating, outside of an iterative triangulation loop with a computer processor, a first set of reusable values corresponding to a calculation of unique elements of an $A^TA$ matrix, wherein the $A^TA$ matrix is a matrix product of a transpose of the A matrix with the A matrix,
calculating, with the computer processor, a second set of reusable values corresponding to a calculation of unique elements of an $A^Tb$ matrix, wherein the $A^Tb$ matrix is a matrix product of the transpose of the A matrix with the b matrix;
computing, based on the first set of reusable values and the second set of reusable values, updatable values corresponding to the unique elements of the $A^TA$ and $A^Tb$ matrices;
computing, based on the updatable values, inverse values corresponding to unique elements of an inverse matrix $(A^TA)^{-1}$; and
computing, based on the inverse values and the updatable values corresponding to unique elements of the $A^Tb$ matrix, solution values corresponding to the respective 3D point associated with the given track;
wherein the inverse values are computed using an SIMD implementation of a cofactor based inverse calculation method.

15. The method of claim 14, further comprising repeating the computing of the updatable values, the inverse values, and the solution values a predetermined number of times.

16. A system comprising:
an input to receive a sequence of image frames from a camera on a vehicle; and
a single-instruction, multiple-data (SIMD) processor coupled to the input to perform a triangulation on multiple tracks simultaneously using SIMD instructions, each track consisting of a plurality of 2D feature points associated with a particular 3D point, the SIMD processor configured to, for each track:
determine 2D feature point input data associated with the particular 3D point from the image frames;
prepare initial A and b matrices based on the 2D feature point input data, wherein each pair of rows of the initial A and b matrices corresponds to a respective image frame in the sequence of image frames, each of the respective image frames containing a respective 2D feature point;
calculate partial $A^TA$ and partial $A^Tb$ matrices based on the A and b matrices, respectively;
compute $A^TA$ and $A^Tb$ matrices based on the partial $A^TA$ and partial $A^Tb$ matrices;
based on the $A^TA$ and $A^Tb$ matrices, compute an estimate of 3D-coordinate output data for the particular 3D point;
compute a weight for each of the respective 2D feature points using the estimate of 3D-coordinate output data; and
scale rows of the partial $A^TA$ and partial $A^Tb$ matrices by corresponding squares of the computed weights.

17. The system of claim 16, wherein the partial $A^TA$ matrix has a number of rows corresponding to a number of unique elements in the $A^TA$ matrix and a number of columns corresponding to a number of 2D feature points used as the 2D feature point input data.

18. A method comprising:

acquiring, from a camera on a vehicle, a sequence of image frames;

performing a triangulation on multiple tracks simultaneously using SIMD instructions, each track consisting of a plurality of 2D feature points associated with a particular 3D point, by, for each track:

preparing initial A and b matrices based on 2D feature point input data associated with the particular 3D point, wherein each pair of rows of the initial A and b matrices corresponds to a respective image frame in the sequence of image frames, each of the respective image frames containing a respective one of the 2D feature points associated with the particular 3D point;

calculating, with a computer processor, partial $A^TA$ and partial $A^Tb$ matrices based on the A and b matrices, respectively;

computing $A^TA$ and $A^Tb$ matrices based on the partial $A^TA$ and partial $A^Tb$ matrices;

based on the $A^TA$ and $A^Tb$ matrices, computing an estimate of 3D-coordinate output data for the particular 3D point;

computing a weight for each of the respective 2D feature points using the estimate of 3D-coordinate output data; and scaling rows of the partial $A^TA$ and partial $A^Tb$ matrices by corresponding squares of the computed weights;

delivering a 3D point cloud based on the estimates of 3D-coordinate output data to a controller; and controlling the vehicle based on the 3D point cloud.

19. The method of claim 18, wherein the estimate of the 3D-coordinate output data is computed by calculating a matrix product of (a) an inverse of the $A^TA$ matrix and (b) the $A^Tb$ matrix.

* * * * *